United States Patent
Roquel

(10) Patent No.: US 10,228,437 B2
(45) Date of Patent: Mar. 12, 2019

(54) ELECTRONIC DEVICE FOR THE NEAR LOCATING OF A TERRESTRIAL OBJECT, AND METHOD OF LOCATING SUCH AN OBJECT

(71) Applicant: Arnaud Roquel, Caluire et Cuire (FR)

(72) Inventor: Arnaud Roquel, Caluire et Cuire (FR)

(73) Assignee: Arnaud Roquel, Caluire et Cuire (FR)

( * ) Notice: Subject to any disclaimer, the term of this patent is extended or adjusted under 35 U.S.C. 154(b) by 89 days.

(21) Appl. No.: 15/532,596

(22) PCT Filed: Dec. 4, 2015

(86) PCT No.: PCT/FR2015/053320
§ 371 (c)(1),
(2) Date: Jun. 2, 2017

(87) PCT Pub. No.: WO2016/087794
PCT Pub. Date: Jun. 9, 2016

(65) Prior Publication Data
US 2018/0017660 A1    Jan. 18, 2018

(30) Foreign Application Priority Data

Dec. 4, 2014    (FR) ..................... 14 61930
Feb. 12, 2015   (FR) ..................... 15 51137

(51) Int. Cl.
*G01S 5/00*  (2006.01)
*G01S 5/02*  (2010.01)

(52) U.S. Cl.
CPC .......... *G01S 5/0263* (2013.01); *G01S 5/0072* (2013.01); *G01S 5/0252* (2013.01); *G01S 5/0257* (2013.01); *G01S 5/0284* (2013.01); *G01S 5/0294* (2013.01)

(58) Field of Classification Search
CPC .... G01S 5/0263; G01S 5/0072; G01S 5/0252; G01S 5/0257; G01S 5/0284; G01S 5/0294

See application file for complete search history.

(56) References Cited

U.S. PATENT DOCUMENTS

2009/0239467 A1* 9/2009 Gulin ................ G08B 5/36
                                                  455/41.2
2013/0130712 A1* 5/2013 Karasudani .......... G01S 5/0257
                                                  455/456.1

(Continued)

FOREIGN PATENT DOCUMENTS

WO    2013/101174 A1    7/2013

OTHER PUBLICATIONS

Xiaolin Guo et al., "An inter-device positioning method based on inertial sensors and wireless signal strength", 2013 3rd International Conference on Consumer Electronics, Communications and Networks, IEEE, Nov. 20, 2013, Abstract only.

*Primary Examiner* — Khai M Nguyen
(74) *Attorney, Agent, or Firm* — Jordan IP Law, LLC; Todd A. Vaughn

(57) ABSTRACT

Wireless electronic devices suitable for tracking a terrestrial object within a close range, and more particularly, an object in continuous or intermittent movement which is bearing a specific device. A device and method for tracking the bearer of a specific electronic device, in an open or closed space using a second device connected to the first by a data link. Methods for determining the exact coordinates of the bearer in movement in a Cartesian plane centered on the second device which may also be itself in movement.

6 Claims, 13 Drawing Sheets

(56) References Cited

U.S. PATENT DOCUMENTS

2014/0274151 A1\* 9/2014 Pattabiraman ........ H04W 4/029
 455/456.3
2014/0288822 A1\* 9/2014 Morrison ................ G01S 19/23
 701/466

\* cited by examiner

Example:
$Acc = 0.3 \, m^2/s$
$Gyro = 0.5 \, rad/s$
$Magn = 0.7 \, rad$

ELECTRONIC DEVICE FOR THE NEAR LOCATING OF A TERRESTRIAL OBJECT, AND METHOD OF LOCATING SUCH AN OBJECT

CROSS-REFERENCE TO RELATED APPLICATIONS

The present application is a National Stage Application of PCT International Application No. PCT/FR2015/053320 (filed on Dec. 4, 2015), under 35 U.S.C. § 371, which claims priority to French Patent Application Nos. 1461930 (filed on Dec. 4, 2014) and 1551157 (filed on Feb. 12, 2015), which are each hereby incorporated by reference in their respective entireties.

TECHNICAL FIELD

The invention relates to the field of wireless electronic devices suitable for tracking a terrestrial object within a close range, and more particularly an object in continuous or intermittent movement which is bearing a specific device. The invention relates more specifically to a device and method for tracking the bearer of a specific electronic device, in an open or closed space (such as: outdoors, shopping mall, stadium, leisure center) using a second device connected to the first by a data link. The invention also relates to methods for determining the exact coordinates of the bearer in movement in a Cartesian plane centered on the second device which may also be itself in movement.

BACKGROUND

Technologies suitable for tracking are known, such as satellite systems (GPS, GLONASS), terrestrial GSM type communication networks, local area networks (Bluetooth, Wi-Fi, Zigbee, ULB, Infra-Red, etc.) or inertial platforms.

Techniques for tracking a device using methods based on time measurements (known to those skilled in the art under the terms Time Of Flight (TOF)/Time Of Arrival (TOA), Time Difference Of Arrival (TDOA)), on an angular measurement of the arrival of the wave (Angle of Arrival (AOA)), on the analysis of the strength of a signal received from an antenna by RSSI measurement (RSSI=Received Signal Strength Indicator), wave phase shift or known zone identification are also known.

The equipment required for the methods cited such as the use of landmarks is also known. A landmark is an item of reference equipment of known position suitable for exchanging a set of information with the remote device. The number of these landmarks is dependent on the tracking technique used as well as the context of use.

Tracking by means of triangulation is known, which processes the information from three landmarks, the cognitive independence whereof is assumed. Triangulation uses only angle measurements (AOA) between the landmarks and the signals received.

Tracking by means of trilateration is also known, which requires, like triangulation, three sources of information, the cognitive independence whereof is observed, but which only uses distance measurements. This distance measurement can be implemented in different ways such as by RF fingerprinting, known zone identification methods or methods known as "fingerprinting". The implementation of these methods requires a learning process liable to render the processing thereof restrictive. Estimation using the time of flight techniques mentioned above (TOA/TOF, TDOA) uses the signal velocity as well as the travel time between transmission and reception of the signal. This solution is subject to the context of use and must account for the type of signal as well as the signal propagation environment; an implementation is described in the document WO 2006/072697 (France Telecom). Some technologies are more suited to these methods than others. For example, ULB (IEEE 802.15.4a) based on the interpretation of TDOA type measurements in indoor environments offers sufficient precision but requires the installation of a considerable infrastructure.

The infrastructures required for each method, the limits of each, according to the study environment as well as the constraints associated with the requirements of use of the solution are also known.

More specifically, there are solutions implementing different technologies which are suitable for tracking an object. Some solutions use an accelerometer, the information whereof is transmitted by a radiofrequency (RF) transmission module. Recently, the technology known as "Bluetooth" has been used to enable communication between a "parent" device and a "child" device.

The document GB 2 349 301 describes the concept of a wireless system suitable for monitoring children, equipped with a transmitter which can be placed in a wristband, using a receiver borne by an adult responsible for monitoring.

U.S. Pat. No. 6,246,379 (Texas Instruments) describes a Bluetooth communication system between two devices, suitable for detecting the position of one of the devices with respect to the other, including in the absence of GPS. The method uses a magnetometer type sensor such as an electronic compass.

U.S. Pat. No. 6,788,199 describes a system for tracking persons, comprising a transmitter-receiver attached to the person to be tracked and a portable tracking device. The latter transmits a tracking signal containing an address code to the transmitter-receiver, which transmits a signal in return if the code is correct. The tracking device using this signal to determine the distance and/or direction of the transmitter-receiver with respect to the tracking device.

U.S. Pat. No. 6,529,131 describes a Bluetooth communication system between two devices (a "master" device and a "slave" device), for detecting the position of one of the devices with respect to the other, in particular for monitoring a child, using data from a GPS. The method uses a magnetometer type sensor such as an electronic compass.

The system described in U.S. Patent Publication No. US 2004/0021569 uses gyroscope and accelerometer data to compute the location of a person, which are transmitted to a master control station, via a wireless communication system. This system operates in a closed structure where GPS signals are not available.

The document GB 2 391 991 describes a wireless system for monitoring children, comprising a device borne by the parent, and a device borne by the child, the two devices communicating with each other by radio waves. The child device is equipped with an electronic compass which shows the child the direction wherein the parent device is located.

U.S. Pat. No. 6,778,902 describes a system for monitoring and tracking persons which is not dependent on a satellite geolocation system, but which is based on a complex method for synchronizing a signal transmitted by the monitoring unit to the monitored unit.

U.S. Pat. No. 7,110,777 describes a system for tracking the movement of an object comprising an accelerometer, an external tracking transmitter-receiver, a processing element, and a radio (RF) transmitter-receiver. The system also comprises a mobile monitor which comprises a processing element and an RF transmitter-receiver. This system is suitable for use in zones where GPS signals are not available.

U.S. Pat. No. 7,667,646 (Nokia) describes a system for determining the direction with respect to a target on the basis of the position of a wireless communication device.

U.S. Patent Publication No. US2008085678 describes a mobile monitoring system for tracking persons, the system comprising: one or a plurality of transmission units having an electrical power supply, an RF circuit, and an RF transmission capability inside a portable enclosure, a mobile reception unit including an electrical power supply, an RF reception circuit, and a user interface, wherein said transmission units transmit RF signals to said reception unit such that the position of each transmission unit can be identified with respect to said portable reception unit. The RF transmission can be a Bluetooth transmission. Several other documents describe the use of Bluetooth technology for enabling communication between the monitor device and a monitored device, but without using information from a compass, a gyroscope or an accelerometer for determining the direction of displacement: these are the documents EP 1 699 183 (Broadcom), DE 102005057578, WO 2010/026566, EP 2 509 343 (Nokia), DE 202013000840.

U.S. Pat. No. 5,289,163 (Perez) describes a tracking system for detecting if the child leaves a predetermined perimeter, and for determining the distance and direction wherein the child is located. The determination of the direction is based on an antenna array. U.S. Pat. No. 6,344,797 also describes the use of antennas for tracking.

Further similar systems based on the exchange of radiofrequency signals are described in U.S. Pat. No. 5,900,817, U.S. Pat. No. 6,078,260 (Sony) and U.S. Patent Publication No. 20030034894.

Moreover, it is known that protocols for tracking a transmitter by means of a received signal strength measurement of an antenna do not enable, as is, sufficiently precise tracking to estimate the distance in sensor arrays (see the publication "De la pertinence du RSSI pour la localisation dans les réseaux de capteurs" by Karel Heurtefeux and Fabrice Valois, published in AlgoTel, May 2012, La Grande Motte, France, <hal-00690748>).

An unsolved problem is the precise tracking (within a typical distance of 100 meters), in a Cartesian plane, of an object in movement equipped with a specific device using a mass-market device (such as a Smartphone), in turn possibly in movement; this tracking being performed independently of the external networks to which these two devices are connected (Wi-Fi base, GPS, GSM, etc.).

The problem that the present invention aims to solve is that of providing a device and method for near-field tracking of an object in continuous or intermittent movement, this near-field tracking extending over a range not exceeding some hundreds of meters and involving the determination of the exact coordinates in a Cartesian plane, of a first object, which can be situated in an open (i.e. outdoors) or closed (i.e. in a building) space using a second object, a reference frame of said Cartesian plane.

More particularly, the objects or subjects in continuous or intermittent movement may be a child or a pet or any other animate or inanimate objects.

SUMMARY

The aim of the invention is that of determining the position or a fixed or mobile device with respect to a second device which may be fixed or mobile. More specifically, one aim of the invention relates to a device comprising a method for determining absolute coordinates in a Cartesian plane of a remote object using an inertial platform and a communication module.

The invention involves the use of two different electronic devices: a so-called "remote" device that may be "mobile", and which is called herein "device C" ("C" for "child"), which is attached to the object for which it is sought to determine the position with respect to a second reference element; and a so-called "reference" device, and which is called herein "device P" ("P" for "parent"), which is borne by the person seeking to determine and monitor the position of the device C with respect to him/herself.

The invention relates to a method for determining absolute coordinates in a Cartesian reference frame of an object using an inertial platform and a communication module.

The device C is a specific device, which may be presented in the form of a small housing, which may be incorporated in a wristband, in a neckband, in a key ring or in a further object borne by the subject to be monitored. The device C includes standard electronic components, and a specifically configured microprocessor. More particularly, the device C particularly comprises an inertial platform including an accelerometer, a gyrometer and magnetometer, as well as a wireless communication module.

Said wireless communication module may use BLE (Bluetooth Low Energy) technology which is selected as it is available on various items of mass-market equipment and consumes little energy. Further UHF (Ultra High Frequencies) radioelectric waves may be used, such as GSM (which requires an access provider), Wi-Fi (which consumes more energy) or NFC technology.

In one advantageous embodiment, the device P is a "Smartphone" type device equipped with a specific application (i.e. software).

In a further embodiment, which can be combined with all the preceding embodiments, a device P monitors a plurality of devices C.

The display of the position on the device P advantageously comprises an arrow indicating the direction and an indication of the distance; this display may be integrated in a Smartphone application.

The invention also relates to the use of the device and method according to the invention for tracking a person bearing said device. More specifically, this tracking is possible, within an operating perimeter, both outdoors (field, forest, open space, stadium, leisure park, etc.) and indoors (shopping mall, building, basement), and the person bearing said device may be a child, an adult, an elderly person, a person practicing a high-risk profession, particularly a firefighter, or any other animate or inanimate object. Said operating perimeter is typically between 5 m and 200 m according to the communication mode.

As such, the invention firstly relates to a method for tracking in a Cartesian plane at least one device C with respect to a device P, given that at least one of the devices C or P is equipped with an inertial platform, and given that each of the devices C and P is equipped with a transmitter-receiver type communication module, said method comprising the following steps: (i) The devices C and P are initialized by the angular synchronization thereof with respect to the terrestrial magnetic north; (ii) At a time tn, the device C receives from the device P, or the device P receives from the device C an RSSI measurement, and the set of possible positions of the device C with respect to P in the metric space of the RSSI measurement is determined; (iii) At the time tn+1, the device P receives from the device C, or the device C receives from the device P, at least one item of information regarding the displacement of the device C and/or of the device P, namely at least the direction as well as the distance traveled for the interval [tn tn+1]; (iv) Said distance is converted into the metric space of the RSSI measurement (referred to as "RSSI domain") and a set of positions is determined in the metric space of the RSSI measurement of the device C with respect to the device P; (v) A new RSSI measurement is received at the time tn+1 and a set of positions of C with respect to P at the time tn+1 is determined; (vi) The relation is determined between the positions estimated in step (iv) and the position(s) determined of the device C at the time tn+1 which arise from step (v); and (vii) It is determined whether the new position(s) calculated in step (vi) are plausible, possible or likely with respect to the positions determined at the previous times (using the relation determined in step (vi)), and then the position of the device C is determined with respect to the device P, wherein step (i) is required in the case where the device C is equipped with an inertial platform and moves during the execution of the method, and optional if the device C does not move during the execution of the method, and the device P must be equipped with an inertial platform so that any displacement thereof can be taken into account during the execution of the method.

More generally: if P is mobile and C stationary, P needs an inertial platform, but not C. If C is mobile and P stationary, C needs an inertial platform, but not P. If P and C are mobile, both need an inertial platform each. The need for synchronization (step (i)) arises if both devices move with respect to one another.

According to the invention, on a display screen of the device P, the position of the device C with respect to the device P is displayed, preferably by a display of the direction and distance.

In one embodiment, in step (vii), the polar coordinates of C with respect to P between tn+1 and tn and/or tn−m (where m≥1) are compared and the most probable position at tn+1 is determined, preferably by correlating these angular differences with the distance calculated between C and P at the time tn.

The initialization at the time tn is advantageously performed by a user of the device P, on the first implementation of the measurement cycle, or is triggered automatically by a triggering event, said triggering event being advantageously the detection of a movement of the device P or of the device C by the respective inertial platforms thereof.

According to one embodiment, the RSSI measurement at steps (ii) and (v) is performed by the device C or by the device P.

Said communication module may be a Bluetooth type module.

The method according to the invention may be borne out with a plurality of devices C, each of which transmits its own identifier and/or on a different frequency and/or with a different communication module and/or with a different communication standard.

The invention further relates to a device comprising an accelerometer and either a magnetometer or a gyrometer, as well as a transmitter-receiver and a microprocessor, said microprocessor being configured to carry out the method for tracking the device C according to the invention.

The invention further relates to a device comprising an inertial platform, a transmitter-receiver and a microprocessor, said microprocessor being configured to carry out the method for tracking the device C according to the invention.

The invention further relates to the use of the method according to the invention or of the device according to the invention for tracking a bearer of the device C with respect to the device P, said bearer being selected in the group formed by: a child; an adult; a person under monitoring in a healthcare, specialized education or retirement facility; a pet; an emergency service responder; a victim of an avalanche or fall into a crevasse.

DRAWINGS

FIGS. 1 to 12 illustrate embodiments of the invention.

FIGS. 1a, 1b and 1c each represent an embodiment of the system according to the invention formed by the devices C and device P and of the method according to the invention, which can be distributed differently on the two devices.

DESCRIPTION

Figure 1A:
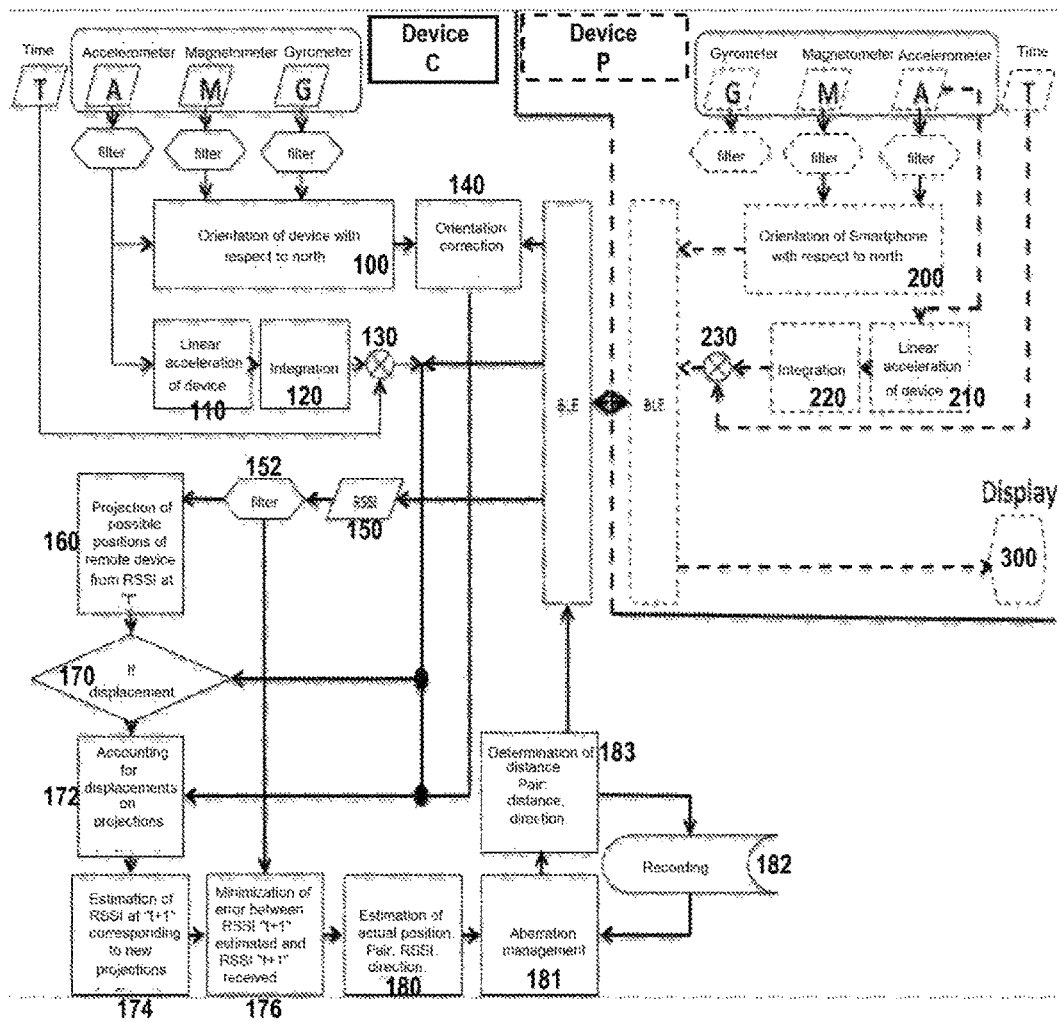

The term "device C" denotes herein the equipment (device) held by the object or by the subject (e.g. by the person) for which it is sought to determine the position: the letter C signifies "child" herein. The device C incorporates a set of sensors required for the tracking thereof as well as a transmitter/receiver.

The term "device P" denotes herein the equipment held by the monitor (the letter P signifies "parent" herein) suitable for estimating the position of the device C with respect to itself. The device P incorporates a set of sensors required for the tracking of C as well as a transmitter/receiver.

The term "accelerometer" denotes herein a sensor measuring linear acceleration. In the static state, the gravitational acceleration will merely be detected. In respect of the term "linear acceleration to the movement", it is noted that the accelerometer supplies the longitudinal acceleration of a body in potential movement. The linear acceleration to the movement is obtained by removing the gravity detected by the accelerometer: this amounts to taking into account merely the acceleration specific to the movement.

The term "magnetometer" denotes herein a sensor measuring the surrounding magnetic field. Within the scope of the present invention, after a calibration step, the magnetometer is used in order to detect the terrestrial magnetic field (the terrestrial magnetic north) followed by the geographic north: this consists of a compass type use.

The term "gyrometer" denotes herein a sensor measuring the angular speed and inferring the rotational speed (tangential to a movement). Within the scope of the present invention, the gyrometer is used to complete the orientation calculation of each device.

The term "inertial platform" denotes herein a set of sensors for determining the relative displacement at each time. Within the scope of the present invention, it comprises an accelerometer, a gyrometer and a magnetometer. The set of this information makes it possible to calculate a "distance, angle" pair (polar coordinate), description of the displacement in an inertial reference frame. In some embodiments of the invention, the inertial platform merely comprises an accelerometer and a magnetometer.

The term "RSSI" (abbreviation of the term "Received Signal Strength Indication") measurement denotes a measurement of the received signal strength on an antenna; the signal may be a Bluetooth signal. Within the scope of the present invention, the RSSI is used as a distance in the metric space thereof or as a measurement of separation between the transmitter and the receiver. The attenuation of the received signal on an antenna is expressed on a logarithmic scale (general in decibels). Consequently, the distance derived from the attenuation of the RSSI ("RSSI distance") is not directly linked with the distance expressed as a metric scale in SI meters.

The term "filter" denotes herein a process reducing signal imperfections (such as the noise thereof) by focusing on useful data extraction.

The term "integration" denotes herein a mathematical operation intended to convert the acceleration information into speed information.

The term "BLE" (abbreviation of "Bluetooth Low Energy") denotes herein a communication standard based on the ISM frequency band 2.4 GHz (Bluetooth) enabling information exchange with one or a plurality of remote hosts.

The term "orientation correction" denotes herein the fact that each device C can determine (after processing) the orientation thereof in a three-dimensional orthonormal reference frame, herein defined by the geographic north and the gravity. The correction is herein required in order to correlate the reference frames of device C and of the device P.

The term metric space denotes herein a set within which a metric defines the concept of distance. This distance will make it possible to interpret the distance between the elements of the set. The metric space of the RSSI measurement is expressed in dBm (decibels relative to a power of one milliwatt) and the metric space of a measurement of a displacement, as can be estimated by an inertial platform, is expressed in meters (basic unit of length of the SI system).

The Friis equation denotes herein the telecommunications formula suitable for obtaining an order of magnitude of the received radio strength by an antenna at a certain distance from the transmitter.

Any measurement, estimation or calculation contrary to common sense specific to sensors or to the processes of origin in the context of use is defined as "aberrant" herein.

The invention aims to track a remote object C with respect to a reference P. More specifically, it aims to track a device C using a reference device P. It accounts in particular for the following aims: (i) The detection of the device C by the device P (for example monitoring of the child by the parent) must be effective regardless of the environment of use (indoor, outdoor); (ii) The use must not require specific additional equipment other than a housing (device C) borne by the monitored person, the device P optionally being a multipurpose mass-market device such as a Smartphone, equipped with a specific program (application). The system is independent of any network other than that used for dialog between C and P; (iii) The precision of the estimation of the direction and of the distance of the remote device must be sufficiently precise for the aim pursued, i.e. that of locating C.

The dependence of the process on remote tracking techniques (e.g.: satellite such as GPS, or GSM mobile network) for the device C cannot be envisaged due to the inability to receive a sufficient signal in some closed environments (building, shopping mall), or geographic zone.

So-called triangulation or trilateration methods cannot be envisaged because they require fixed third-party references (landmarks). Pedestrian navigation on the basis of the information from the inertial platform is not suitable for determining the distance and direction with sufficient precision due to the degradation thereof over time. So-called intelligent cooperation methods (association of different methods) are suitable for circumventing some drawbacks specific to each technique (for example the association of pedestrian navigation and GPS), but are not consistent with the aims cited above.

It is noted that the aim of the invention is not the geolocation of the device C with respect to the terrestrial reference frame (terrestrial geographic coordinates); this geolocation of the device C is however possible by referring to the geolocation coordinates of the device P, for example if the device P is a Smartphone having a satellite geolocation module.

The aims of the invention are achieved by a method processing an indication regarding the intensity of the received signal (perception of attenuation between a transmitted signal and a received signal) in relation with displacement data originating from an inertial platform of one or more device(s) (C and P).

According to the invention, the device C comprises an inertial platform, a microprocessor and/or a transmitter/receiver using radioelectric waves (radio waves). Advantageously, said transmitter/receiver operates in so-called ISM (abbreviation of "Industrial, Scientific and Medical") frequency bands. A wireless communication standard which may be used within the scope of the present invention is for example the Bluetooth standard (ISM band of 2.4 GHz). The device P also comprises an inertial platform as well as a transmitter/receiver compatible with the transmitter/receiver of the device C (preferably a Bluetooth system).

FIG. 1 shows the physical architecture of the system, the steps of the method and the information flows between the devices C and P. The method is based on four items of raw information each originating from a physical measurement, namely the measurements originating from the accelerometer, gyrometer, magnetometer and the RSSI measurement. As such, not more than four items of raw information can transit between the device C and the device P. As explained hereinafter, it is however preferred to reduce the information flow between the two devices. A detailed description of this embodiment will be given hereinafter in section J.

According to embodiments of the invention shown in the diagrams of FIG. 1, the (distance, angle) pair relative to the displacement of the device C is calculated by the microprocessor thereof. As such, not more than three items of information only will need to be transferred from the device C to the device P, namely: the distance, angle, and RSSI.

FIG. 1a describes an embodiment for the physical architecture of the system according to the invention, distributed on the device C (mobile or fixed) and the device P (herein a Smartphone). Each of the two devices comprises an inertial platform. Each of the devices P and C processes the data A, M, G measured thereby. The two devices communicate herein with a BLE data link. The calculation of the position of C with respect to P is performed by the device C and transmitted to P for display.

In one advantageous embodiment of the invention, the method is carried out so as to process maximum information in the microprocessor of the device C so as to minimize the quantity of data to be transferred to the device P. Minimizing the quantity of data to be transferred also reduces the electricity consumption of the device C. The device P comprises means for displaying the position of the device C; these means advantageously comprise a display screen. The device C or P also comprises a memory unit.

Figure 1B:
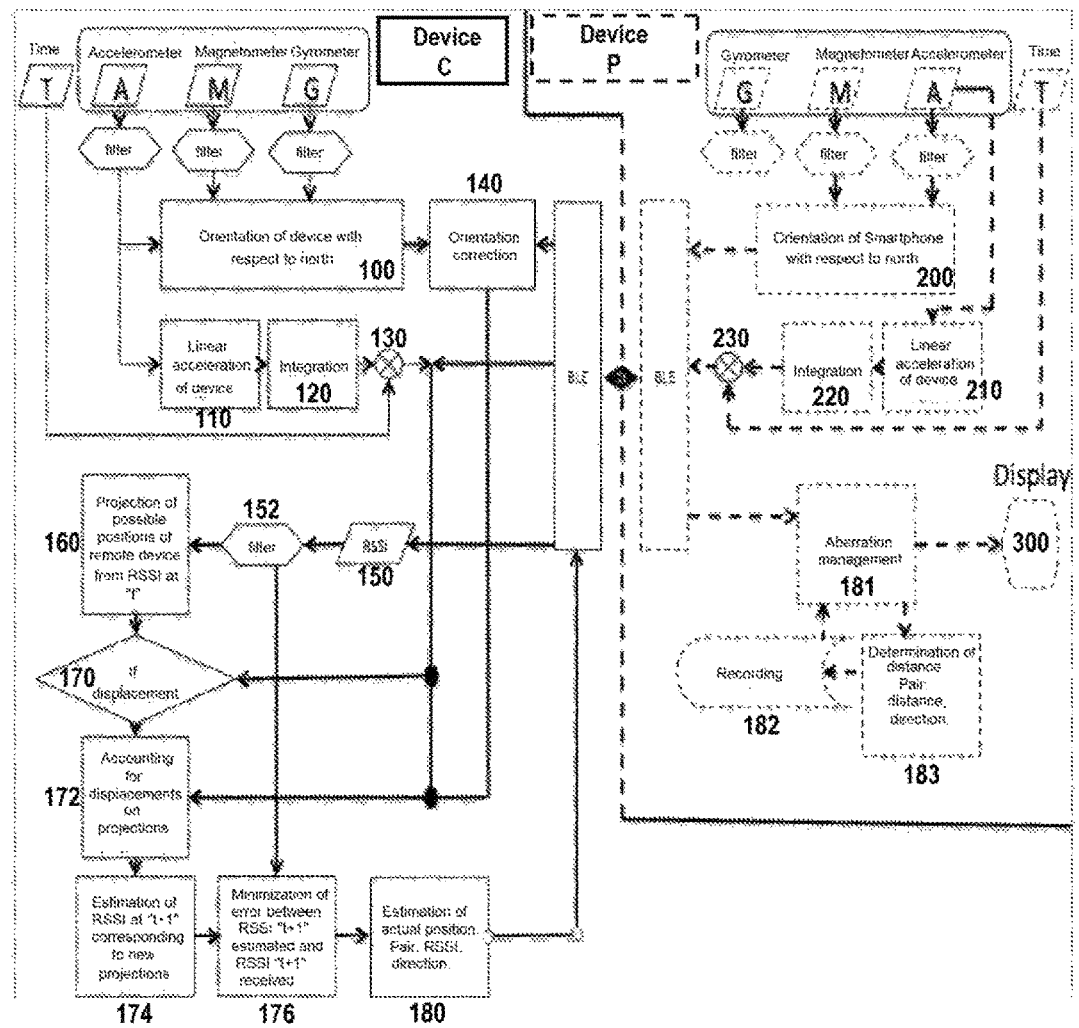
Figure 1C:
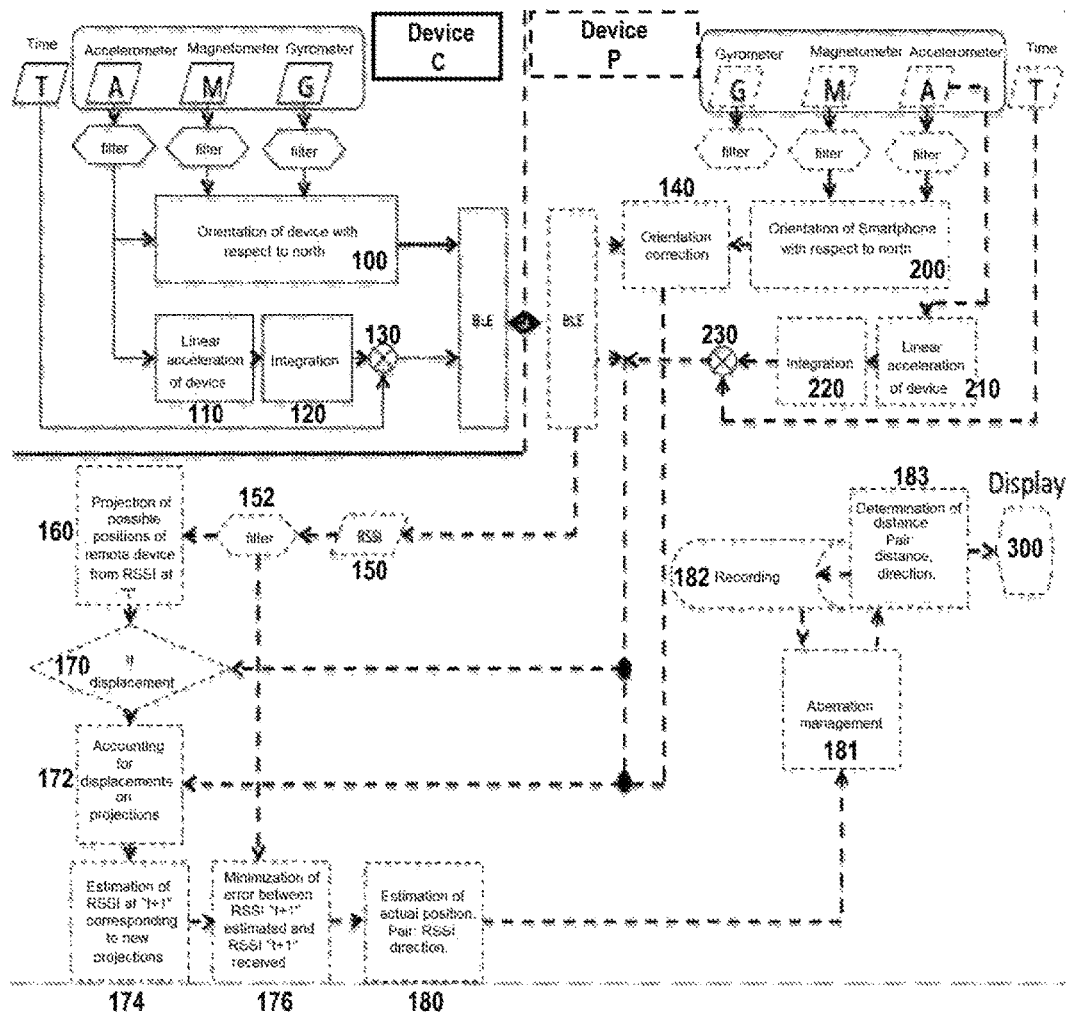

The example given in FIG. 1a for the distribution of the tasks between the devices C and P meets this objective, but the tasks may be otherwise distributed between the two devices. FIGS. 1b and 1c show further distribution possibilities.

FIG. 1b shows an embodiment wherein the device C measures and interprets the data from the inertial platform thereof, receives from the device P the information relative to the movement of P and carries out the set of calculations apart from the aberration calculation. The device P measures and interprets the data from the inertial platform thereof and transmits the information relative to the movement thereof to C. After having received from C the estimation of the position of C, the device P verifies the possible aberrations of the position of C, then displays the result on the screen thereof.

FIG. 1c shows an embodiment wherein the device C measures and interprets the data from the inertial platform thereof and then transmits this information to P. P measures and interprets the data from the inertial platform thereof, estimates the position of C with respect to itself, calculates the aberrations and determines the position of C with respect to P and displays the result on the screen thereof.

In an alternative embodiment of the embodiment according to FIGS. 1a, 1b and 1c, the two devices P and C do not necessarily each need an inertial platform consisting of an accelerometer, a magnetometer and a gyrometer: the method may be carried out if one of the two devices possesses an inertial platform consisting of an accelerometer and either a magnetometer or a gyrometer. In particular, the device P (which may be a "smartphone" type device) may not possess a gyrometer but merely an accelerometer and a magnetometer. However, it is preferable that each of the devices P and C possesses its own inertial platform.

The method according to the invention is based on the association (intelligent cooperation) of two items of information, namely the RSSI measurement and the displacement measurements of C and P for estimating the distance and angle between C and P between two times. This is illustrated in FIG. 2.

Figure 2A:
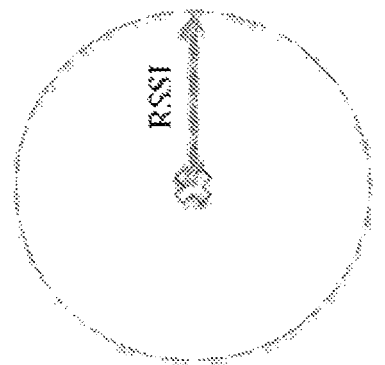
FIG. 2a represents the measurement from the BLE module.

FIG. 2a represents an RSSI measurement, the x representing the reference frame, i.e. the reference of the device P, the arrow representing the received signal strength on the antenna, the circle representing the possible location of the device C.

Figure 2B:
FIG. 2b represents the measurements from the inertial platform with respect to the reference frame thereof.

FIG. 2b represents a measurement of the displacement of the device C obtained by means of an inertial platform, which comprises a directional component (from the magnetometer), an acceleration component (from the accelerometer) and an angular velocity (from the gyrometer).

Figure 3:
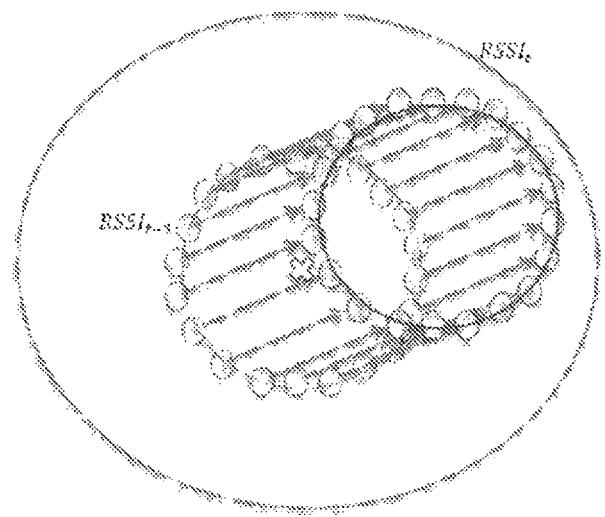
FIG. 3 represents a simplified illustration of the variation of the RSSI information provided by BLE.

FIG. 3 shows the location of the device C at the time tn, the distance whereof with respect to P is evaluated in the metric space of the RSSI measurement. Only taking this metric into account, the device C can be located at any point on the circle of radius "RSSI". During the displacement of the device C between tn and tn+1, the circle of radius RSSI is displaced in the direction of displacement of the device C.

According to the invention, a circle is determined around the device P and of radius RSSI whereon the device C is reliably situated (within the measurement uncertainty). The reasoning of the process is carried out while remaining in the metric space of the RSSI measurement, "the RSSI domain". As long as none of the devices C and device P are not moving, angular or distance information cannot be obtained with sufficient precision. Once the device C and/or the device P move, this displacement will be taken into consideration after conversion in the "RSSI domain". The displacement is used, determined using the accelerometer and the time elapsed as well as the direction, with respect to the reference P, on the basis of the association of an accelerometer/gyrometer data pair or an accelerometer/magnetometer pair (preferred) or by all three at once (this depends on the ambient magnetic context: the presence of a local magnetic field may interfere with the magnetometer measurement).

Within the scope of the use of the inertial platform, the method according to the invention makes it possible to determine the displacement of the remote device C or P at each time. When the device is borne by a human, as in the context of pedestrian navigation, the latter consists of interpreting the human displacement as a "step" and determining a distance and direction for each of these steps.

For a device C or P in movement, the accelerometer measures the longitudinal acceleration perceived in square meters per second (m2/s), the gyrometer measures the angular velocity ($\theta$ gyro/s) in radian per second and the magnetometer measures the offset angle of the reference frame specific to the device with the magnetic north ($\theta$ magn) in radian. Each of these information sources must be configured, filtered, calibrated, corrected over time. Generally, the detection of a step (impact action followed by an acceleration) is performed with the accelerometer by detecting the acceleration peak on the axis of gravity, collinear with the sagittal axis of the bearer. The distance measurement of the displacement can be estimated using different methods on the basis of the mean distance traveled in one step, given the size of the legs, or by integrating the values of the accelerometer multiplied by the time elapsed. For the latter technique, ZUPT (Zero velocity UPdaTe) type processes may help limit integration errors.

Estimating a trajectory by integrating the movement relative to each time cannot be envisaged according to the method of the invention, Indeed, the bearer of the device C may make "particular", erratic movements, which differ from a "normal" movement (for example a "normal" gait). Furthermore, the imprecision of the sensors can also induce integration errors.

Within the scope of an RSSI measurement (in the metric space thereof i.e.: not expressed in meters but in dBm), the use of the Friis equation (which will be explained in greater detail hereinafter) for converting the RSSI measurement into meters, is difficult to apply in the context of use.

According to the invention, the only reliable observable values (within the measurement precision thereof) that are taken into account are the RSSI measurement (and not the interpretation thereof in meters) at a given time t, as well as the data from each sensor of the inertial platform available to the devices C and P.

According to the invention, on the basis of a measurement of the received signal strength of an antenna in dBm (RSSI measurement), with each potential position of C determined on the basis of the RSSI measurement at the time tn is associated the displacement itself estimated on the basis of the inertial platform after conversion in the "RSSI domain". (As a general rule, the "RSSI domain" (or "RSSI metric") represents a measurement space wherein the unit in question is in dBm; this unit represents a ratio between the strength measured in decibels and a milliwatt). The step for estimating the direction is performed by minimizing the error between the circle estimated by projecting the displacement of C or P at the time tn and the new RSSI measurement, at the positions of C at the present time "tn+1". This will be explained in greater detail hereinafter under point C in relation with FIG. 4.

The device P may move. Therefore, it is necessary to take into account the movement thereof in the various steps. As will be explained hereinafter, the displacement of this reference P provides a solution to the problem of tracking the device C in the case wherein the latter is immobile.

After synchronizing the magnetic north of each device, the initialization of the process at the first time (FIG. 2a) makes it possible to define the possible position of C in the RSSI metric space at a time tn.

During the second time (tn+1) (FIG. 3), the displacement of C between tn and tn+1 makes it possible to define the projection of the displacement of the subject in the RSSI metric space at the time tn. At this time tn+1, a new RSSI measurement is performed and is compared to each estimated position of C after projection. Subsequently, the identification of the position of the subject occurs by implementing a so-called aberration management or time management calculation.

The implementation of the various steps of the method according to the invention in the devices P and C will be described in greater detail hereinafter under point D.

A general description of the method for determining the exact coordinates of a device C in movement or not in a Cartesian plane centered on P itself fixed or in movement, using an inertial platform available in C and/or in P and a communication module according to the invention is given herein with reference to FIG. 4.

In a first step, if it is considered that C may be mobile, the devices C and P are initialized by the angular synchronization thereof with respect to the terrestrial magnetic north. This initialization can be performed by a user of the device P, particularly at the first implementation of the measurement cycle. In a preferred embodiment of this step, the initialization is performed automatically, by a triggering event. This triggering event may be the detection of a movement of the device P or of the device C by the respective inertial platforms.

In a second step, at a time tn, an RSSI measurement is received. According to the implementation of the method, this measurement may be performed either by the device C or by the device P. It represents the attenuation of the signal transmitted by C or P according to the separation distance of said devices and the measurement context. At a time (e.g.: tn) and in a non-dispersive environment, the RSSI measurement of P to C is theoretically identical to the measurement C to P.

In a third step, on the basis of the RSSI measurement of the step 2, the set of possible positions of the device C with respect to P at the time tn is determined. These positions may be represented by a circle of radius RSSI and of center P.

In a fourth step, according to the technical configuration selected: (i) the device P receives at the time tn+1 an item of information on the displacement of the device C calculated on the interval [tntn+1], (ii) or the device C detects at the time tn+1 an item of information on the displacement of the device P calculated on the interval [tntn+1].

After converting this distance into the "RSSI domain", by projecting the positions of C at tn, a set of positions is estimated in the RSSI metric domain of the device C with respect to the device P at tn+1.

In a fifth step, a new RSSI measurement is available at the time tn+1. As for the third step, a set of positions of C with respect to P at the time tn+1 is determined.

In a sixth step, according to the embodiment, the device P or C determines by means of a comparative algorithm or other association algorithms, the relation between the positions estimated in step 4 and the positions determined of the device C at the time tn+1 derived from the step 5.

In a seventh step known as "aberration management", it is determined whether the new position(s) calculated in step 6 are plausible, possible or likely with respect to the positions determined at the previous times. The position of the device C with respect to the device P is then estimated.

In one advantageous embodiment of this step, the polar coordinates (distance from the center of the reference frame and angle) of C with respect to P between tn and tn−1 and/or tn−m (where m>1) are compared. The solution(s) of tn are compared with those of the previous times and it is determined which is the position at tn. The preferred criterion will be the angular difference between the points at tn and tn−1 (expressed as an angle θ) correlated with the distance at the time tn. Various techniques will be described hereinafter for aberration management.

This sequence is illustrated in FIG. 4 for a concrete example. Step 1 is represented by FIG. 4a, step 2 by FIG. 4b at a time tn. Step 3 is represented by FIG. 4c. At this time, the direction of C cannot be determined, C may be situated anywhere on the circle of radius "RSSI".

Figures 4A, 4B:
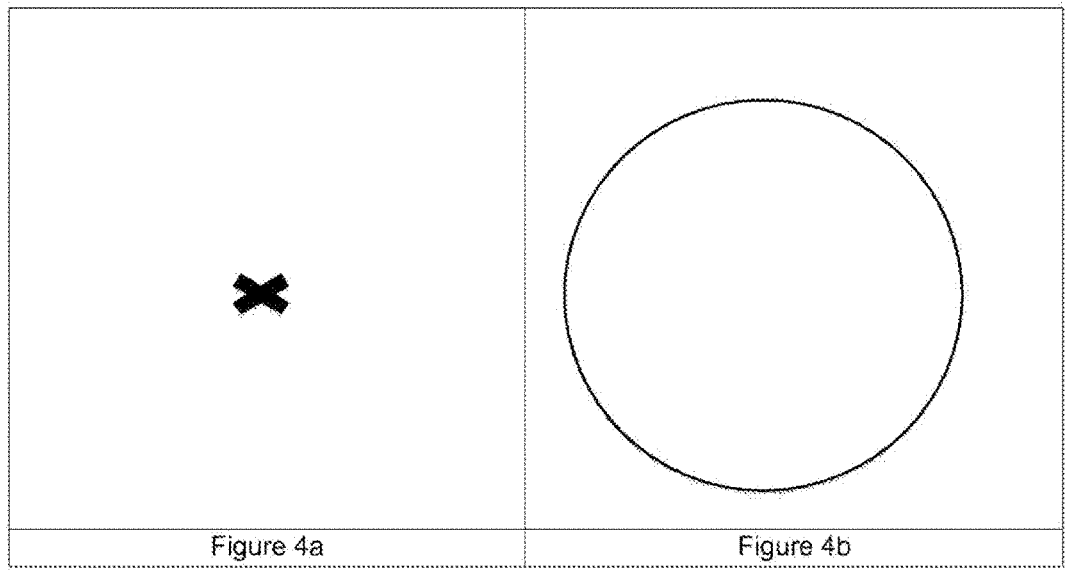
FIG. 4 represents the method for determining absolute coordinates in a Cartesian plane of an object in movement using an inertial platform and a communication module.
Figures 4C, 4D:
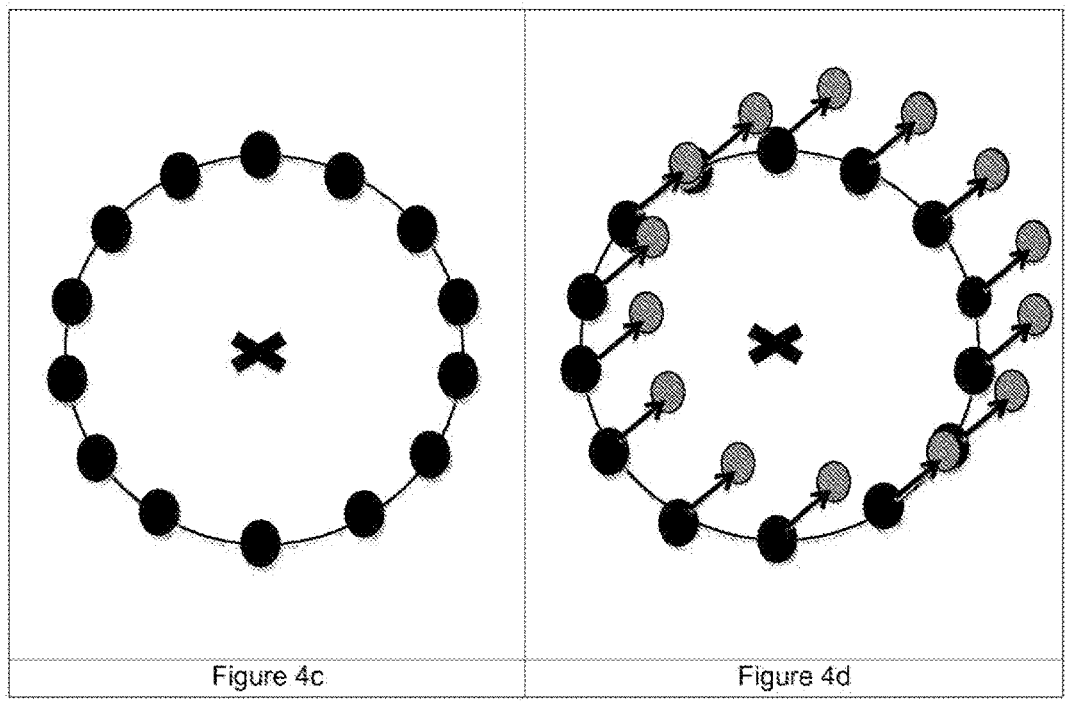

Step 4 is represented by FIG. 4d, where the arrows represent the displacement of the device C in the "RSSI domain"; a projection of the circle representing the possible position of C at the time tn as a function of the displacement of C between tn and tn+1 is performed. The new circle represents the estimation of the positions of C at the time tn+1. In this instance, the displacement of the device C gives rise to the distancing thereof from the device P.

Figure 4E:
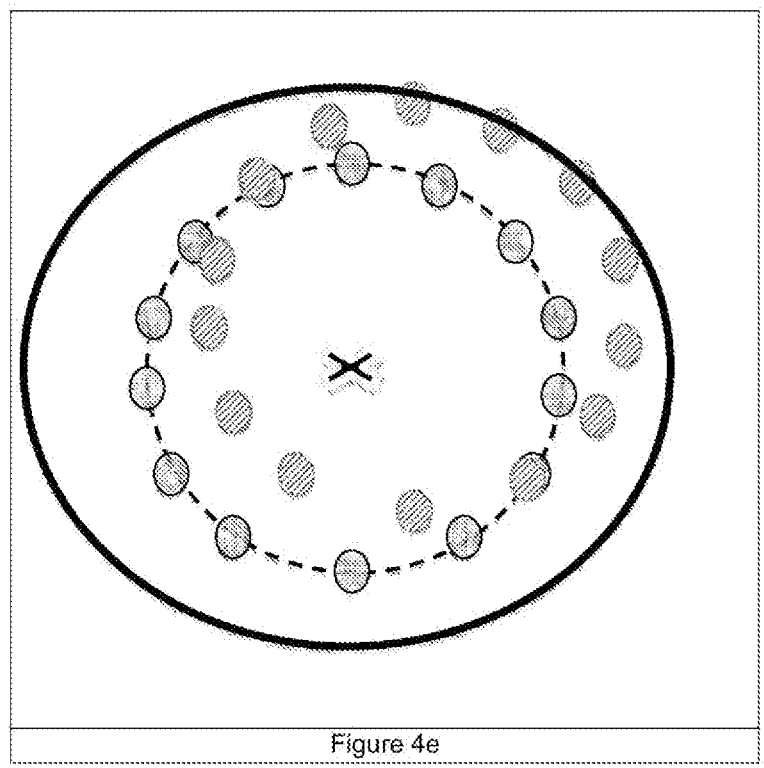

Step 5 is represented in FIG. 4e, where new positions of C may be deduced from a new RSSI measurement at the time tn+1. They are represented by the outer circle (black line).

Figure 4F:
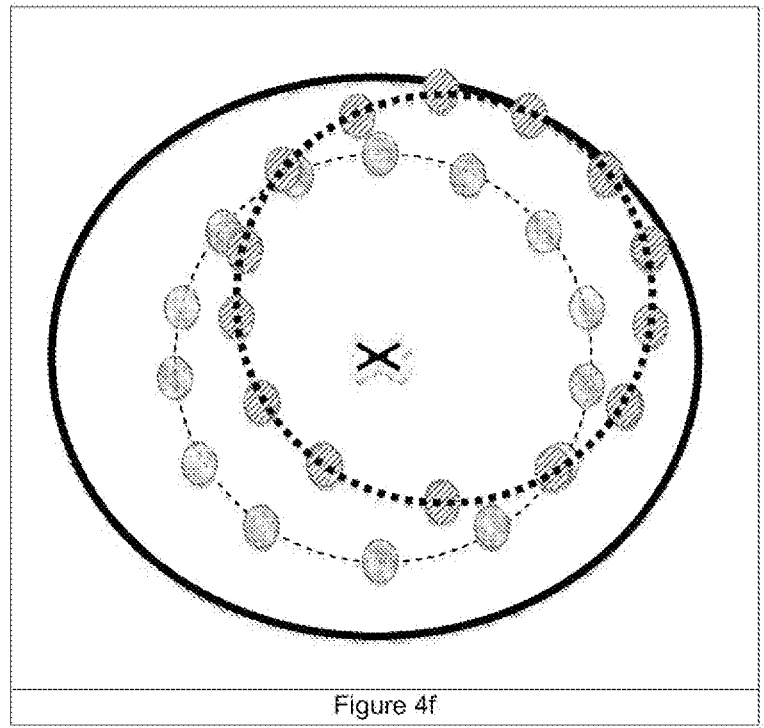

Step 6 is represented in FIG. 4f where the zone(s) minimizing the error between the circle estimated in step 4 (projection of the circle of time tn by interpreting the displacement of C between tn and tn+1) and the circle from the RSSI measurement at the time tn+1 (step 5) are sought. When the circles intersect, this zone represents the intersection(s) between the two circles.

Figure 4G:
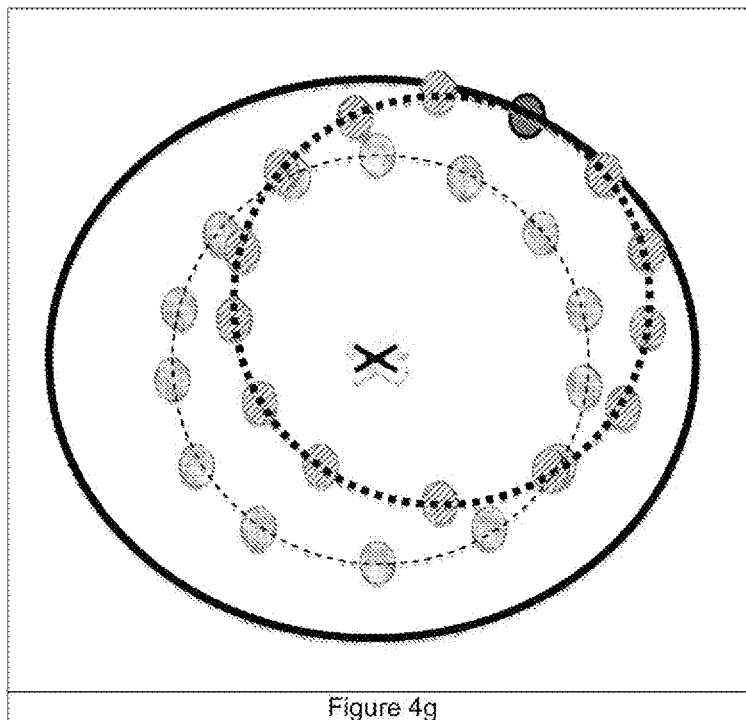
Figure 4H:
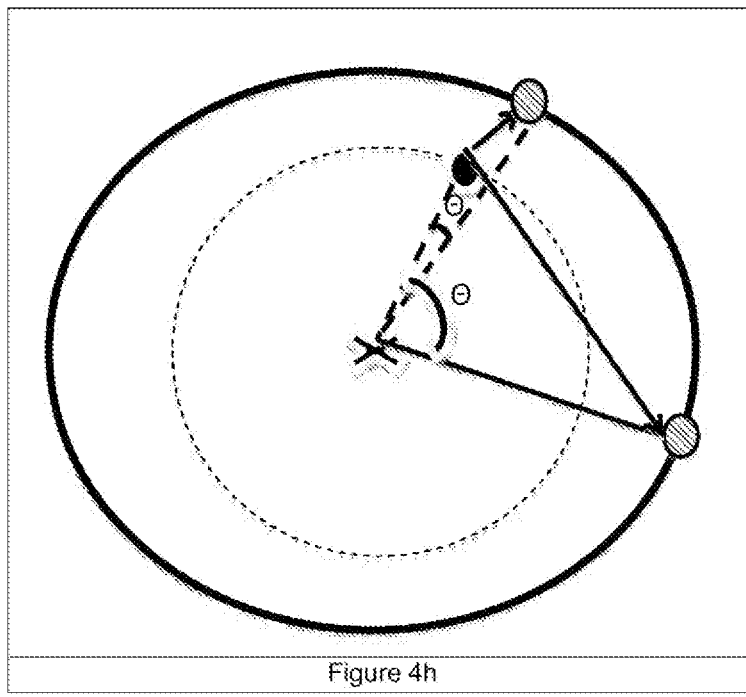

Step 7 is illustrated in FIGS. 4g and 4h. In one embodiment, so-called "aberrant" positions (illustrated in FIG. 4h) are determined so as to eliminate false measurements (point of intersection identified in FIG. 4h); this point of intersection represents the position of the device C. This aberration calculation is required particularly when the determination of the position of C (error minimization zone(s)) gives rise to anomalies. In the theoretical case, the two circles touch at a point, and this point could serve as a reference for the following step. However, the RSSI measurements as well as the measurements of the inertial platforms being, like any physical measurement, uncertain and imprecise, it is possible that the two circles do not touch, or that they intersect and show two intersections. In these cases (which may also arise when the device P moves), each of these estimated locations (at tn) may be compared to the previous ones (at tn-m where m≥1) to eliminate the least probable or least plausible location (this management can be compared to temporal tracking). In the case where the circles do not touch, the point corresponding to the minimum distance between the two circles may be determined.

Following step 7, a new cycle starts automatically with step 2; as such, the device P can track in real-time the direction of the device C. The time scale (Δt) between two cycles (i.e. the time interval [tn tn+1]) may be constant or not.

This method may be implemented in different ways, some of which will be described hereinafter by way of illustration.

In a first embodiment, the interval Δt is fixed. Preferably, it starts at the commencement of a movement detected by P or by C. The value of Δt may be preset, for example to one or two seconds.

In further embodiments, the interval Δt is not fixed.

In a second embodiment, the end of the interval Δt is defined by the stoppage of the movement or by a change of acceleration corresponding typically to the end of a human step.

In a third embodiment, a fixed Δt is not chosen, but a fixed Δd (i.e. the distance in meters traveled by the device P and/or the device C during a displacement), as determined using the inertial platform of the device P or of the device C. The value of Δd may be of the order of a meter, but this value is advantageously chosen at a lower value if the distance between the devices P and C is short, and at a higher value if the distance between the devices P and C is greater. Indeed, the attenuation of the signal (interpreted by an RSSI value) is more perceptible if the devices P and C are close. It is desirable to avoid, between two successive measurements, the difference between the RSSI measurements received being zero or non-significant (given that the RSSI measurement is in dBm, namely in a logarithmic scale). It is noted that, if both P and C move (potentially at the same time), each of these displacements is calculated, and initial positions deduced from C are projected on the circle (step 2). According to the embodiment, the device P or C which performs the calculation will need to know the displacements of the two devices; this is described in greater detail hereinafter.

In a further embodiment, a fixed Δt is not chosen but a fixed difference of RSSI measurements (ΔRSSI) between two times, sufficiently great to be able to define with sufficient significance.

It is noted that, as a general rule, the lower Δt is, the more precise the tracking is, but Δt should be sufficiently great so that the RSSI measurements are measurably different between tn and tn+1.

The tracking of the device C by the device P requires a relative displacement between the two devices (a displacement of C or of P or both). In a frequent case, it will be the device C which moves (and the device P may be fixed or mobile): for example, the parent (bearer of the device P) sitting on a bench monitors his/her child (bearer of the device C) in a play area. If the device C does not move, the displacement of the device P makes it possible to track the device C. Accounting for the displacement of the device P implies that the latter also includes an inertial platform.

Figure 4I:
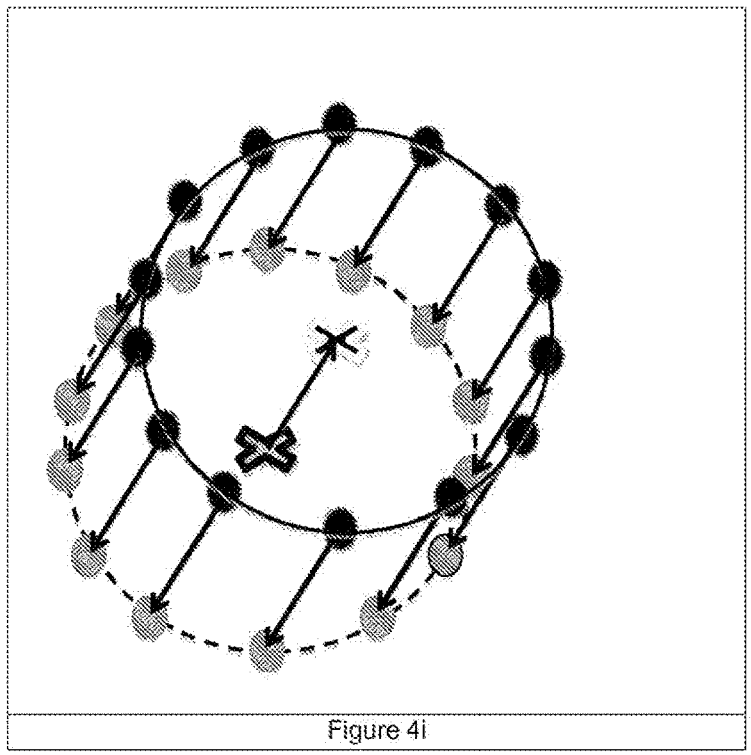
Figure 4J:
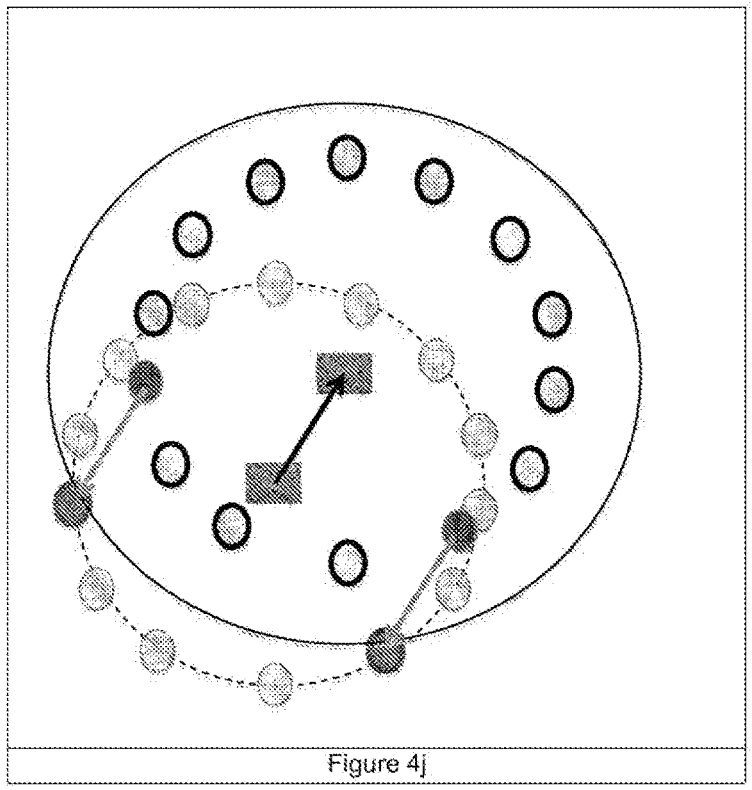
Figure 4K:
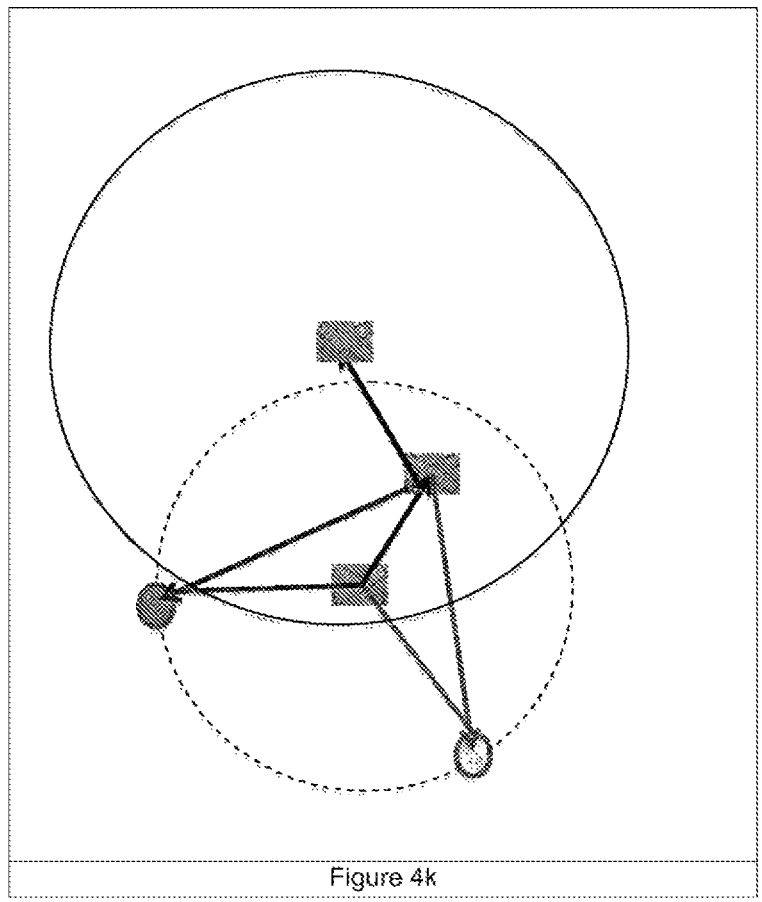

FIG. 4i illustrates this case where the device P moves. At tn, the device P moves, the inertial platform of P makes it possible to detect the direction and the distance of this displacement, and this displacement is projected on the positions of C determined at tn (RSSI measurement at tn). At the end of the displacement of P (or more generally at the end of the interval Δt, this end optionally being determined, as described above in relation with the displacement of the device in movement, by the end of said displacement), a new RSSI measurement is received (large circle, FIG. 4j) and, as described in step 6 in relation with FIG. 4f, the possible position(s) of the device C with respect to the device P are calculated. As indicated in FIG. 4j, this comparison gives rise sometimes to different solutions (according to the potential imprecisions), and the aberration management by temporal tracking (i.e. comparison with previous locations, for example at tn−1) which makes it possible to decide which position best defines the location of C (as shown in the example in FIG. 4k).

The method according to the invention can also be applied to the case where the devices P and C both move at the same time.

Implementation of the Method According to the Invention in the Devices P and C

The various steps of the method according to the invention may be implemented either in the device P or in the device C, suitably configured.

Three embodiments for integrating the various functions of the method in the devices P and C are described in greater detail herein.

In a first embodiment, the device C includes the set of components required for position calculation and aberration management, namely a microprocessor configured for carrying out the calculations required, a memory for recording the data, a communication module, an inertial platform (IMU, "Inertial Measurement Unit") and other equipment. In this case, during the study, the device P transmits the information relative to the displacements thereof to the device C. The result of the process, namely the estimation of the position of C with respect to P, is transmitted to the device P which will display the result.

In a second embodiment, the device C includes the set of components required for position calculation, namely a microprocessor configured for carrying out the calculations required, a communication module, an inertial platform (IMU) and other equipment. The device P incorporates a memory enabling it to record the polar coordinates at each time of the position of C with respect to itself. In this case, during the execution of the method according to the invention, the device P transmits the information relative to the displacements thereof to the device C. The result is transmitted to the device P, validated by the aberration management step and displayed.

In a third embodiment, the device C merely includes the components required for the measurement and calculation of the displacement thereof relative to itself namely a microprocessor suitable for the calculation, a communication module, an inertial platform (IMU) and other equipment. The device P will incorporate a memory enabling it to record the polar coordinates of the positions of C at each time, as well as a microprocessor enabling it to carry out the calculation of the position. The device C transmits the estimation of the displacement thereof to the device P which implements the other steps of the method, carries out the process and estimates the polar coordinates of the position of the device C with respect to itself (P), manages the aberrations and displays the result.

The method according to the invention may be carried out with a plurality of devices C, of which each transmits the specific identifier thereof and/or on a different frequency. This enables a device P to monitor a plurality of devices C at the same time.

A general description of the method using the RSSI measurement by interpretation of the attenuation of the signal received by an antenna is given herein.

The use of the solution requires that the method for tracking a device C with respect to P is independent of the external networks and reduced solely to communications between P and C or between C and P. As such, conventional triangular or trilateration methods and other processes using third-party equipment or recognition of the study environment (magnetic or radioelectric field recognition, "fingerprinting" type methods) cannot be envisaged for the method according to the invention.

Furthermore, the solution should be capable of functioning in an optionally closed environment, on a near field of some hundreds of meters. This reduces the techniques suitable for use to radioelectric waves.

Within the scope of the use of UHF (Ultra High Frequencies) radioelectric waves in fields such as GSM, Bluetooth, Wi-Fi, GPRS, EDGE, UMTS, GPS (etc.), the frequency f used is situated in the range 300 MHz≤f≤3 GHz. The wavelength λ (period of the signal) is in the range 1 m≥λ≤0.10 m. In vacuum or in air, the signal is propagated at the speed of light (300 km/s) and it will be practically impossible with mass-market equipment to estimate a distance of some tens of meters by means of a TOF, TOA or TDOA type time-of-flight measurement (this approach can be used for a GPS type signal, in view of the great distance separating the Earth from satellites).

Besides inertial platform type solutions, inter-device (C and P) measurements can only, in the embodiment chosen, be performed by analyzing a measurement conveying the transmitter/receiver strength ratio.

The method according to the invention uses an estimation by interpretation of the attenuation of the ratio of the transmitted signal strength with respect to the received signal; this is performed when the received signal strength on the antenna attenuates or increases. There are different rules for determining the distance on the basis of this measurement.

It is known that the RSSI (Received Signal Strength Indicator) is a measurement in dBm representing a factor ten of the ratio of the received strength and the transmitted strength. As such, theoretically, the received strength is inversely proportional to the squared distance.

The Friis transform is an equation for converting an RSSI measurement into a distance in meters on the basis of a set of variables specific to the transmitter and receiver systems. This distance is actually the analogy of the distance separating the latter if and only if the signal travels a direct path (a line) between the two elements (transmitter/receiver). This estimation is based on the transmitted strength, the gain of both antennas, the wavelength used as well as the distance separating the transmitter from the receiver:

$$Pr(\text{dBm}) = 20 * \log(4\pi/\lambda) - 10 * n * \log(d) + Gt + Gr + Pt \text{ (dBm)}$$

Where Pr, Pt represent the signal transmission and reception strength in dBm; λ corresponds to the transmitted signal wavelength; n represents the attenuation factor of the signal velocity (referred to as "path loss exponent"); in a free space, the strength is assumed to decrease with the distance by an inverse square relation (n=2); Gt, Gr represent the gains of the transmission and reception antennas; and d corresponds to the distance between the transmitter and the receiver.

The Friis equation may be formulated so as to calculate the distance between the transmitter and the receiver.

$$\log(d) = (Pr(\text{dBm}) - K)/(-10 * n)$$

$$\ln(d)/\ln(10) = (-Pr(\text{dBm}) + K)/(10 * n)$$

$$d = \exp(\ln(10) * [(-Pr(\text{dBm}) + K/(10 * n)])$$

$$d = 10^{\wedge}[(-Pr(\text{dBm}) + K)/10 * n)].$$

where K represents a constant relative to the various gains and strength, "exp" the exponential function and "∧" the exponent function.

Figure 5:
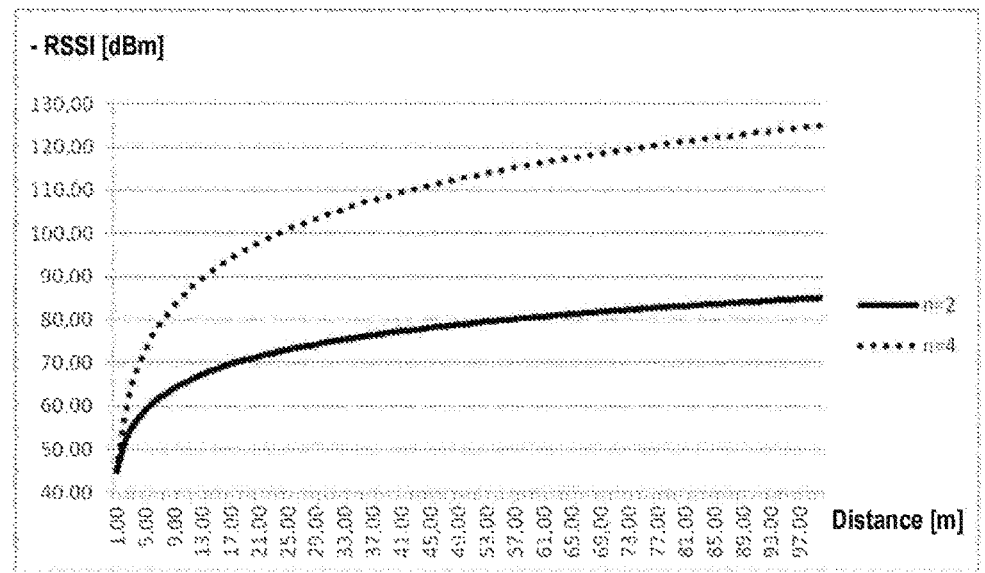
FIG. 5 represents an application of the Friis formula which illustrates the theoretical RSSI value as a function of the distance between transmitter and receiver and for two values of the coefficient n.

FIG. 5 illustrates the theoretical value of Pr or the RSSI measurement according to the distance in meters between the transmitter and the receiver (for a simpler observation, the opposite of the RSSI values is marked in the figures). A value of K at −45 dBm is set (RSSI measurement at 1 meter). It is observed that the coefficient n ("path loss exponent") has a strong influence on the values of the distance evaluated on the basis of the RSSI measurement.

Most frequently, the values of n and K are estimated empirically. This must be recalculated for each device and "n" must be updated upon a change of the environment (e.g.: place, humidity, etc.).

The distance measurement between two devices using only the RSSI measurement is mentioned in the literature but few technical solutions use this method. In the case of indoor operation, the interpretation of the distance using the RSSI is even more difficult due to possible bouncing of the signal on the various walls existing in this environment.

The inventor realized that it is unlikely that there is a solution for estimating the distance and the direction directly on the basis of RSSI processing for the following reasons: (i) Not being able to predict the presence of interfering elements with the signal sent such as a person/obstacle placed in the trajectory of the signal received by the receiver. This causes attenuation of the received signal strength by the antenna; (ii) The greater the distance, the more the reliability of the calculation by interpreting the RSSI decreases. The causes are the reflection of the transmitted signal, loss of strength due to the environmental context, etc.; and (iii) The orientation of the "device" and the position thereof on the bearer may change, which renders the estimation of the parameters of the Friis equation even more difficult (in practice, the transmission cone may vary according to the orientation of the antenna and the electronic design of the device may have an influence on the directivity thereof).

Considering that the study environment may vary, it is observed that none of the methods according to the prior art is suitable for calculating with sufficient precision the distance between the transmitter and the receiver. It is observed that an error of estimation of the coefficient n ("path loss exponent") implies an error of the calculation of the distance increasing the separation distance between transmitter and receiver.

Figure 6:
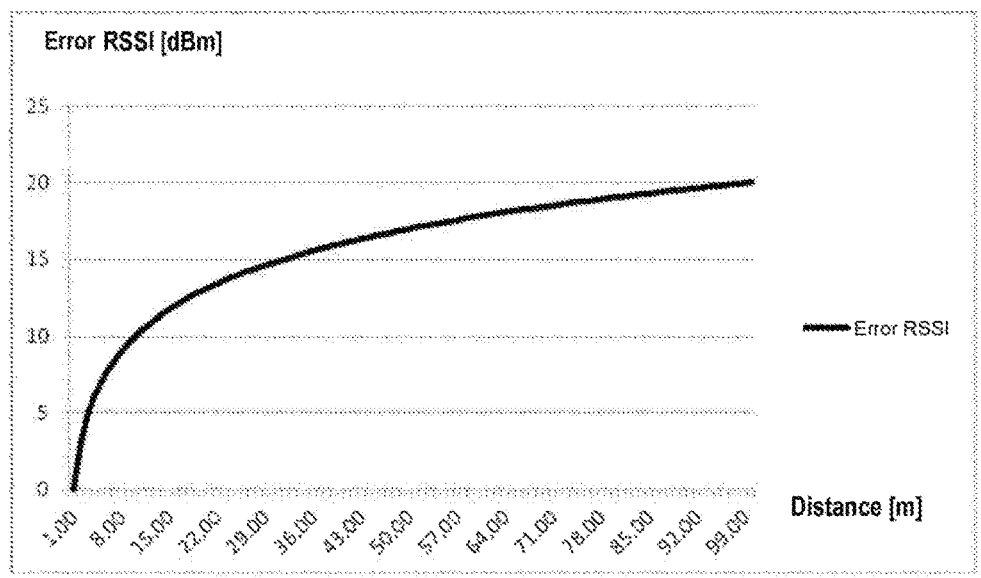
FIG. 6 shows the RSSI error committed if the calculation is performed with n=3 instead of n=2.

By way of example, let us consider K=−45 and n=2. FIG. 6 shows the RSSI error committed if the calculation is carried out with a coefficient n=3 instead of n=2. The error is expressed by the absolute value of the difference of the RSSI values for n=2 and n=3. It is observed that the greater the distance between transmitter and receiver, the more the error increases.

The coefficient n ("path loss exponent") being a variable that is difficult to control, it is necessary to find a suitable compromise making it possible to associate the RSSI measurement and the estimation of the displacement from each of the inertial platforms. For this, the method according to the invention resolves the location of the device C in the RSSI metric space and converts the distance into meters calculated by each of the inertial platforms in the RSSI domain. Indeed, the latter estimating distances of the order of one meter (typically between 0.1 m and 2 m), the potential error due to an incorrect estimation of the coefficient n will only have a slight impact on the position calculation result.

Let us consider Δd the distance of the displacement calculated on the basis of the information provided by the inertial platform of C or P between the times tn and tn+1. To this displacement in meters corresponds a displacement in the "RSSI domain" annotated as ΔRSSI herein. The calculation of ΔRSSI (conversion of Δd to ΔRSSI) will be explained in the following section. Due to the non-linearity of the Friis equation, the value of ΔRSSI for a fixed Δd changes according to the RSSI value at the time tn in question.

Figure 7:
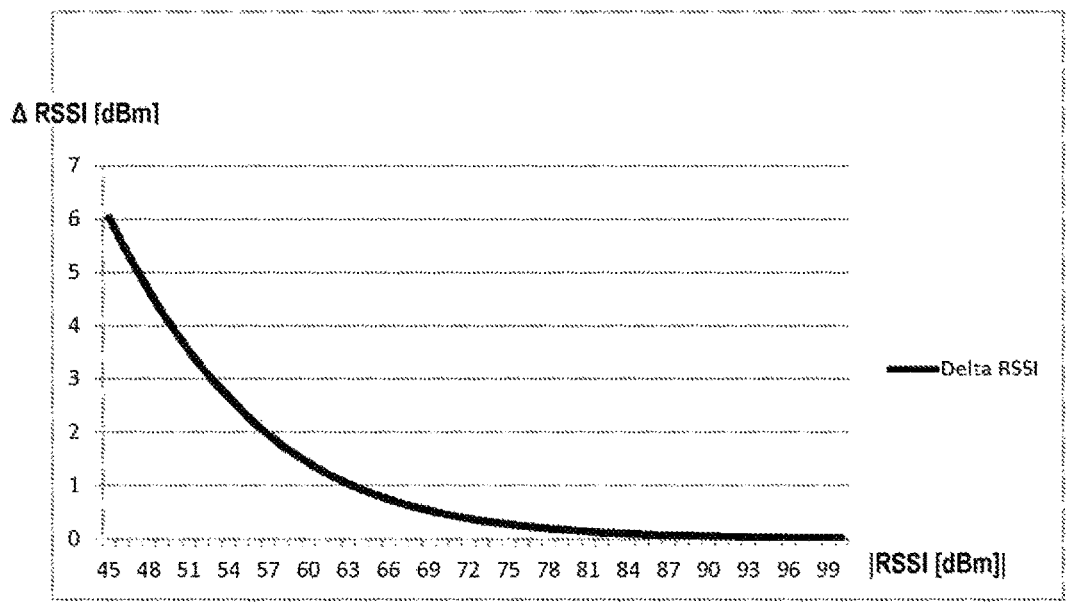
FIG. 7 shows ΔRSSI for a displacement of 1 meter as a function of the absolute RSSI value.

FIG. 7 illustrates the variation of "ΔRSSI" according to the RSSI measured at tn (case K=−45, n=2) for a displacement of Δd=1 meter. It is observed that as the greater than RSSI measured, the lower "ΔRSSI" is. In order to retain a significant value of "ΔRSSI", the measurement of the displacement Δd should be sufficient (i.e. varying according to the separation distance of C and P).

Figure 8:
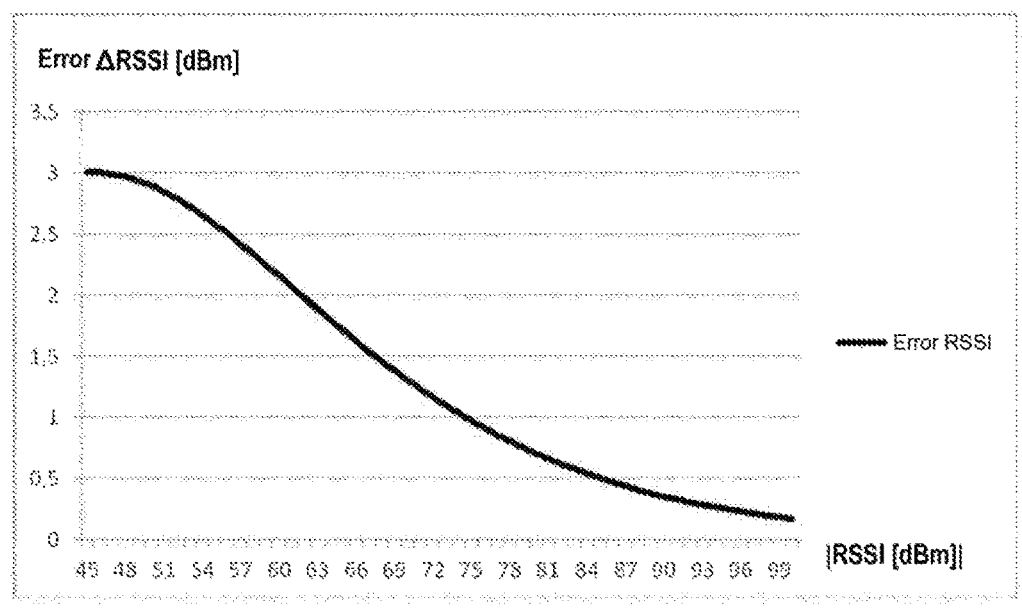
FIG. 8 shows the error on ΔRSSI as a function of the absolute RSSI value.

Let us consider now an error on the estimation of the parameter n (n=3 instead of n=2) and observe the error on the ΔRSSI. This error is obtained by the absolute value of the differences of the ΔRSSI calculated with n=2 and n=3. Let us consider Δd=1 and K=−45. It is observed in FIG. 8 that the error on the ΔRSSI values due to an incorrect estimation of the coefficient n ("path loss exponent") induces an error that can in the case of the study be interpreted as low (less than 1.5 dBm at =10 m). A normal step can be considered to be less than 1 m, which reduces the value of Δd with respect to the illustration, the error is thus even lower. However, aberration management by temporal tracking makes it possible to correct the result in the case where the error would impact the estimation of the position of C in the "RSSI domain".

The method according to the invention therefore necessarily comprises a step wherein the metric displacement in meters (originating from the inertial platform) is converted into displacement in the "RSSI domain" (dBm). If, for example, the inertial platform measures a displacement Δd of 1 meter (displacement distance), this displacement distance is associated by conversion with a ΔRSSI of x dBm. This conversion is difficult as it involves the parameters K and n of the Friis equation which are dependent on the device and the environment.

We have shown that the ΔRSSI value for a given Δd is dependent on the distance between the devices P and C and on the exosystem of these two devices (i.e. of the environment separating these two devices, insofar as it can impact RF wave propagation). As explained above, this environment is taken into account by the coefficient n ("path loss exponent") in the Friis equation: Theoretically n=2 in an "open air" environment (free space), but various tests demonstrate that n varies between 2 and 4 in a space disrupted by trees, walls, cars, etc.

The greater the value of Δd (i.e. the displacement between two measurements at tn and tn+1), the less the estimation of ΔRSSI is liable to be precise (due to the uncertainty of n). A time interval Δt=tn+1-tn is therefore advantageously chosen between two measurement times of the displacement Δd so as to obtain a low but statistically significant ΔRSSI (the confidence of the calculation based on a "short" step (typically 0.6 m) will be greater than on a calculation based on a "long" step (typically 1.5 m)).

Figure 9:
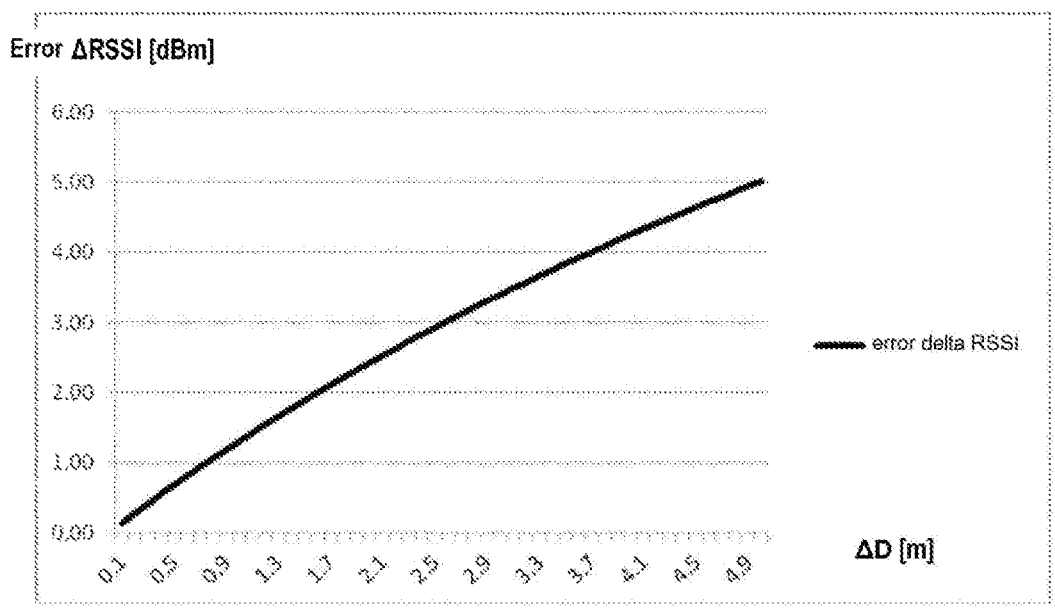
FIG. 9 shows the error on ΔRSSI as a function of the displacement Δd in meters.

FIG. 9 illustrates the error on the ΔRSSI relative to an incorrect estimation of the coefficient n (n=3 instead of n=2) according to the Δd in question. More specifically, this figure shows the error in absolute values of the difference of the ΔRSSI calculated respectively with n=2 and n=3 according to the displacement Δd in question (where K=−45 and considering a distance between C and P measured by an RSSI at −70 dBm). It is observed that the greater Δd is, the greater the error is, which confirms the statements above.

In the following section, we present the various calculations and methods used in order to process the RSSI measurements.

Solutions for interpreting the displacement of the devices C and P in the "RSSI domain" (dBm) are described in greater detail herein.

The use of so-called "conventional" techniques for converting an RSSI type strength ratio into a distance value are subject to the evaluation of the exosystem of the equipment. Within the scope of the use of the Friis equation, two parameters are to be evaluated. The first corresponds to the initial value of the received strength on the antenna (RSSI measurement) at a known distance (variable K in the equation) than can be defined as a constant (measured typically at 1 meter). The second is relative to the signal attenuation factor named the "path loss exponent" (variable n in the equation), the value of which is dependent on the environment of use of the solution.

An error in the assessment of one of these parameters implies an error in the distance estimation. As seen above, the latter increases significantly upon the separation of the two devices P and C.

Within the scope of the invention, unlike the conventional case where a conversion of the RSSI measurement to a distance in meters is performed for a reasoning based in the metric space of SI meters, the set of projections are performed herein in the space of the RSSI measurements (dBm). This choice makes it possible to limit the errors due to the environment (i.e. an incorrect estimation of n).

Figure 10:
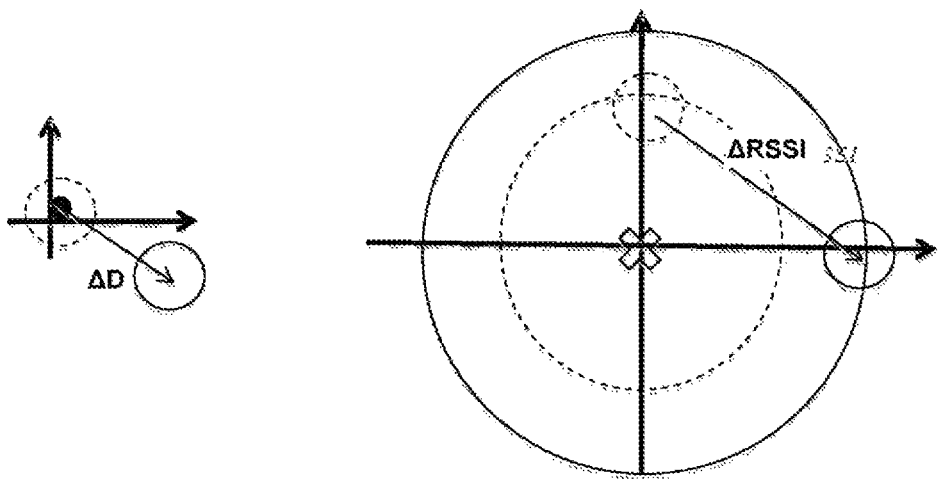
FIG. 10 illustrates the projection of a displacement of coordinate (Δd, angle) in the Cartesian reference frame converted into a displacement of coordinate (ΔRSSI, angle) in the RSSI domain.

In order to retain sufficient precision regardless of the context of use, it is preferred, within the scope of the present invention, to use the Friis equation for the calculation of "small" distances such the displacement between two times of C and P. This conversion makes it possible to project to the potential positions of C at tn the displacement of C or P between the times tn and tn+1 in the "RSSI domain"; this is illustrated in FIG. 10.

Let the displacement vector of C or P be annotated Vect(R) in the "RSSI domain" between the times tn and tn+1, centered on the orthonormal reference frame specific to C or P. The argument of the displacement of C or P is annotated θ[tn tn+1]. Let us assume a displacement of C, the origin of Vect(R) is defined by the position of C at tn (considered as the origin of the reference frame associated with Vect(R)), the second point forming Vect(R) is defined by:

$$x=|\Delta RSSI[tntn+1]|*\cos(\theta[tntn+1]);$$

$$y=|\Delta RSSI[tntn-1]|*\cos(\theta[tntn+1]);$$

Where ΔRSSI[tn tn+1] is the ΔRSSI value at the times tn and tn+1.

Three methods may be cited for the calculation of ΔRSSI [tn tn+1]:

Method 1: A Fixed Parameter n is Used

Theoretically, the value of the parameter n is 2 (see Friis equation). A first method consists of setting the value of n to a determined value. It may be defined by various field tests or correspond to the theoretical value (n=2). In practice, the latter solution is valid when the devices C and P remain in a near field and in a favorable context for measurement (e.g. an outdoor park with moderate crowds).

Let Pr be an RSSI value measured at $t_n$:

$$RSSI[tn]=Pr[tn];$$

$$d[tn]=10\wedge[(RSSI[tn]+K)/10*n];$$

$$d'[tn+1]=d[tn]+\Delta d[tntn+1];$$

$$RSSI'[tn+1]=-10*n*\log(d'[tn+1])+K;$$

$$\Delta RSSI[tntn+1]=RSSI'[tn+1]-RSSI[tn];$$

Where K is the constant of the Friis equation calculated at a distance of d0=1 m, d'[tn+1] the distance C to P (or P to C) at the time tn+1, RSSI'[tn+1] the RSSI value estimated at the time tn+1 and Δd[tn tn+1] the displacement distance measurement of C or P between tn and tn+1.

Method 2: The Uncertainty of the Parameter n is Introduced

In practice, the value of the parameter n varies according to the context and the separation distance between C and P. A field calibration specific to the testing demonstrate that the parameter n can be evaluated in an interval [2 4]. According to the invention, for each bound of this interval, a solution is estimated in the RSSI for determining the extrema of the displacement (in the RSSI domain).

| $n = n_{min}$ | $n = n_{max}$ |
|---|---|
| $RSSI[t_n] = Pr[t_n];$ $d[t_n] = 10 \wedge [(RSSI[t_n] + K)/10*n];$ $d'[t_{n+1}] = d[t_n] + \Delta d[t_n\, t_{n+1}];$ $RSSI'[t_{n+1}] = -10*n*\log(d'[t_{n+1}]) + K;$ $\Delta RSSI[t_n\, t_{n+1}] = RSSI'[t_{n+1}] - RSSI[t_n];$ $\Delta RSSI_{min}[t_n\, t_{n+1}]$ | $\Delta RSSI_{max}[t_n\, t_{n+1}]$ |

Example

The initial RSSI value at a known distance of 1 meter is −45 dBm. At a time t0 (start of movement of the device C), the RSSI value is −60 dBm. At a second time t1, the distance measurement of the device C is 0.7 m.

Assuming the lower bound of the parameter n (n=2), the displacement measured in the RSSI domain is 1.0190 dBm.

Assuming the upper bound of the parameter n (n=4), the displacement measured in the RSSI domain is 4.4933 dBm.

The interval considered for the displacement of the device C in the RSSI domain will be [1 4.5].

Method 3: The Uncertainty of the Parameter n is Introduced by Interpreting the "Possible" Movements of the Devices C and P.

As for method 2, a study interval is considered wherein the minimum value will this time be according to the movement of the devices C or P. In the context of the study, the minimum displacement in the RSSI domain is bounded by the difference of the RSSI received at $t_n$ and $t_n+1$.

| $n = n_{max}$ | |
|---|---|
| $RSSI[t_n] = -Pr[t_n];$ $RSSI[t_{n+1}] = -Pr[t_{n+1}];$ $\Delta RSSI_{min}[t_n\, t_{n+1}] = RSSI[t_{n+1}] - RSSI[t_n];$ | $RSSI[t_n] = Pr[t_n];$ $d[t_n] = 10 \wedge [(RSSI[t_n] + K)/10*n];$ $d'[t_{n+1}] = d[t_n] + \Delta d[t_n\, t_{n+1}];$ $RSSI'[t_{n+1}] = -10*n*\log(d'[t_{n+1}]) + K;$ $\Delta RSSI_{max}[t_n\, t_{n+1}] = RSSI[t_{n+1}] - RSSI[t_n];$ |

Any measurement, estimation or calculation contrary to common sense specific to sensors or to the processes of origin in the context of use is defined as "aberrant". Many of these aberrations are due to parasitic signals (referred to as "glitch") returned by the sensors and/or an influence of use in an uncontrolled context. The detection of aberrations may be performed by determining critical values, by temporal tracking (study of previous values) or by correlating the results with the practical use of the process. Within the scope of the invention, aberration management will be performed for each new result of the process.

By way of example, if a child wearing a wristband including the device C hit his/her wrist against a table, this will generate an abrupt acceleration signal unrelated to the usual signals upon moving the body: this signal will be interpreted by the method, which will produce a mathematical solution, but which will produce a mathematical solution, but which should be identified as being aberrant with respect to the data identified as "normal".

Within the scope of the use according to the present invention, the devices C and P may be borne by humans moving in an environment suitable for receiving walkers. As such, according to the separation distance perceived by the process, the direction of C with respect to P can only vary to a certain degree.

By way of example, if the location of the device C is determined at a distance of 20 meters with an angle of 90 degrees (by convention facing P), then C cannot be situated at 180 degrees at the following time (behind P).

Three methods for processing aberrations may particularly be used:

Method 1: Management by Comparison Between Two Times tn and tn−1

At each time, the angle of the coordinate of C with respect to P determined by the process is compared to the argument of the previous polar coordinate of C. If this comparison is greater than a certain threshold, then the measurement at tn will be said to be aberrant. The threshold should be defined in correlation with the distance separating C and P.

If |θE[tn]−∝θ[tn−1]|<α, then the position of C with respect to P is said to be valid (where α is the value of the threshold and θE[tn] the angle of the position of C with respect to P)

Method 2: Management by Studying the Mean of the Last N Estimations (from tn to tn−N)

At each time, the argument of the coordinate of C with respect to P determined by the method according to the invention is compared to the mean of the arguments of the previous N coordinates of C. If this comparison is greater than a certain threshold then the measurement at tn will be considered aberrant. The threshold should be defined in correlation with the distance separating C and P.

If $|\theta E[tn]-(1/N)*\Sigma i=Ni=1\ \theta E[tn-1]|<\alpha$, then the position of C with respect to P is said to be valid (where a is the threshold, N>0, $\theta E[tn]$ the angle of the position of C with respect to P and $\Sigma i=Ni=1$ the formulation of the sum of 1 to N).

Method 3: Management by Probabilistic Study

For each time, a "prospective estimation" of the polar measurement at t may be determined by a Gaussian law according to the past times and measurements from the inertial platform. As such, for the polar measurement calculated at t, a probability is associated. If this is sufficient, the measurement is then validated.

Determination of the Distance Between C and P

In this section, the inventor presents a method for estimating the distance between the devices C and P.

Figure 11:
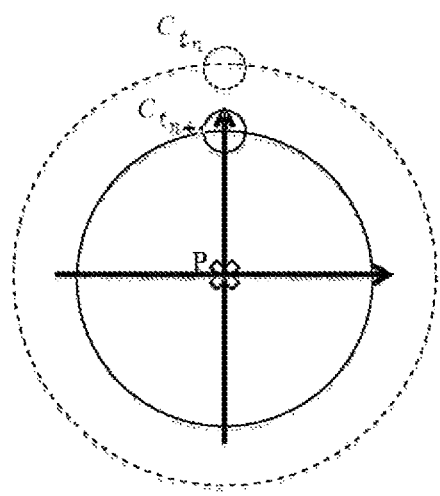
FIG. 11 illustrates a method for determining the distance between the devices C and P. Scenario where P is directed toward C or C is directed toward P.

In the context of the implementation of the solution, the device P is directed toward the device C most generally in a straight line (so as to locate C as quickly as possible); this is illustrated in FIG. 11.

In this scenario, there is theoretically equality between $\Delta RSSI[tn\ tn+1]$(interpretation of the displacement of P or C in the RSSI domain between the times tn and tn+1) and the difference in the RSSI measurements at the times tn and tn+1

It will be noted that the following calculation is also valid when it is observed that $\Delta RSSI'=\Delta RSSI=RSSI[tn+1]-RSSI[tn]$, with $\Delta RSSI'$ of displacement of P or C in the RSSI domain.

Let us assume that K, the initial value of the RSSI measurement at a distance of 1 meter (d0=1), is known.

$$\Delta RSSI = RSSI[tn+1] - RSSI[tn];$$

$$\Delta RSSI = -10*n*[(\log(d[tn]+\Delta d[tntn+1])-\log(d[tn]))];$$

$$\Delta RSSI/(-10*n) = \log((d[tn]+\Delta d[tntn+1])/d[tn]);$$

$$10^{\wedge}[\Delta RSSI/(-10*n)] = \Delta d[tn\ tn+1]/d[tn];$$

$$d[tn]*10^{\wedge}[\Delta RSSI/(-10*n)] = d[tn]+\Delta d[tntn+1];$$

$$d[tn] = \Delta d[tntn+1]/(10^{\wedge}[\Delta RSSI/(-10*n)]-1);$$

This latter equation is the solution of the distance between P and C (or C and P) at the time tn.

This equation can also be used for adapting the parameter n ("path loss exponent").

Use of the device according of the invention

A non-exhaustive list of the possible uses of the device and method according to the invention is given herein. Each of these uses makes use of a monitor (bearer of the device P) and one or a plurality of devices C for which it is necessary to determine the position with respect to the device P.

Parents, grandparents, childcare workers:
  Primary requirement: knowing the location of the child/children (bearing a device C).
Community centers, schools:
  Primary requirement: knowing the location of groups of children (bearing a device C).
Private theme parks:
  Primary requirement: handling the supervision of groups of children (bearing a device C)/feedback on client movement.
Nursing home, psychological/psychiatric treatment centers:
  Primary requirement: knowing the location of residents (bearing a device C).
Mountaineers, mountain hikes:
  Primary requirement: locating a person (bearing a device C) in danger as quickly as possible (in particular under an avalanche or in a crevasse).
Pet owners:
  Primary requirement: locating one's pet (bearing a device C).
Museum, tourism operators:
  Primary requirement: handling flows of tourists (bearing a device C) during visits.
Persons registered on dating sites:
  Primary requirement: facilitating contacts/meetings between persons bearing a device having the specific application suitable for carrying out the method according to the invention.
Firefighters and other emergency personnel:
  Primary requirement: tracking/locating a remote object (bearing a device C) or a person (bearing a device C) with no access to an external network (in particular in a building or a basement).
Sports events:
  Primary requirement: tracking athletes (bearing a device C) during the competition.

The device according to the invention can also be used as an antitheft device and/or for detecting the loss of an object bearing the device C and locating the object.

Examples for the distribution of the calculation steps on the devices C and P

The description of the various embodiments shown schematically in FIGS. 1a, 1b and 1c are described in more detail herein.

In a first embodiment described schematically in FIG. 1a:
The devices C and P each determine:

(a) on the basis of the filtered signals from, respectively, the accelerometer thereof, the magnetometer thereof and the gyrometer thereof, the orientation of the device C (step 100) and P (step 200), respectively, with respect to the north;

(b) on the basis of the filtered signals from the accelerometer, the linear acceleration of the device C (step 110) and P (step 210), respectively;

(c) on the basis of this linear acceleration, by integration (steps 120 and 220, respectively) and accounting for the time (steps 130 and 230, respectively), the displacement thereof.

The device P transmits to the device C, preferably via a Bluetooth type link (BLE), the orientation of the device P with respect to the north and the displacement thereof. These data are used by a step for correcting the orientations with respect to the interpretation of the north of P and C (step 140). A measurement of the RSSI is determined (step 150).

The RSSI measurement, optionally after filtering, is used for the projection of the possible positions of the remote device at the time t (step 160); if, in this step, a displacement of C or/and P is observed (step 170), accounting for said respective displacements of the devices C and P (determined, respectively, in the steps 130 and 230), these displacements are taken into account for the projections (step 172) using the corrected orientation of the device C obtained in the step 140. The RSSI at a time t+1 corresponding to the new positions of the remote device is then measured (step 174), the error is minimized between the estimated value of RSSI at t+1 and the measured (received) value of the RSSI at t+1 (step 176); the position of the device C (step 180) expressed by an "RSSI and direction" pair is estimated, the aberrations are managed (step 181), the distance is determined (step 183) so as to express a "distance and direction" pair and this pair is recorded (step 182).

The result obtained in step 183 is transmitted to the device P, preferably via a Bluetooth type link (BLE), for display on the display device (step 300).

FIGS. 1b and 1c show schematically further embodiments of the same method steps, but some of which are distributed differently on the two devices C and P. This implies different programming of the microprocessors contained in the devices C and P, and the quantity and the nature of the data transiting between the two devices (preferably via a Bluetooth type link (BLE)), will be different.

More specifically, in the embodiment according to FIG. 1b, the steps 181, 182 and 183 are carried out in the device P and not in the device C.

In the embodiment according to FIG. 1c, only the steps 100, 110 and 120 are carried out in the device C, and consequently, the data describing the orientation of the device C with respect to the north from the step 100) and the displacement thereof (from the step 130) are transmitted (preferably via a Bluetooth type link (BLE)) to the device P.

As a general rule, the filters used (for example in FIGS. 1a, 1b and 1c those which are indicated before the steps 100 and 200, and those corresponding to the reference 152 and used in the steps 180 and 182) may be of different types of filters known in signal processing, for example a median filter or a Bayesian filter (preferably second order).

Further embodiments based on a further distribution of the steps on the two devices can be envisaged within the scope of the present invention.

Further communication modes between the device P and the device(s) C can be envisaged within the scope of the present invention.

EXAMPLE

In this example of an embodiment, a radiofrequency wave communication means of a frequency of 2.45 GHz commonly known as Bluetooth is used.

The device C used in this example is equipped with a Bluetooth 4.0 communication module (BLE CC2541) at 0 dBm enabling a range of 80 to 100 meters (in open field). This module is onboard an electronic board consisting of a tri-axis accelerometer (KXTJ9 from Hionix, range±4 g), a tri-axis magnetometer (MAG3110 Freescale), a tri-axis gyrometer (internal to the InvenSens IMU-300 component), a microprocessor (8051) as well as a battery. It enables operation both indoors and outdoors. This module (which represents the device C) is linked directly with a BLE-compatible Smartphone possessing an inertial platform consisting of at least an accelerometer and a magnetometer. This Smartphone represents the device P. The application dedicated to the solution is installed on the Smartphone. Both devices are independent of any external networks, which enables operation of the solution in all zones (in the chosen application) indoors or outdoors and without financial or geographic constraints.

Figure 12:
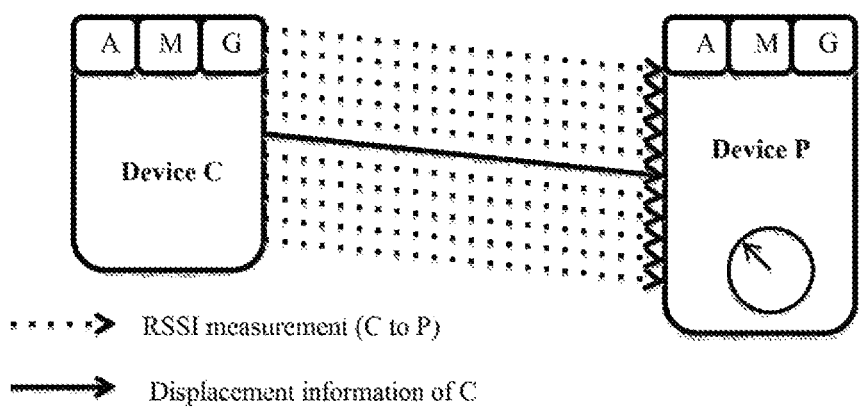
FIG. 12 illustrates the RSSI measurement made by the device P which detects the signal transmitted by the device C (dotted arrows), and the flow of information (black arrow) on the displacement of the device C transmitted by the device C to the device P, this information originating from the three sensors (A, M, G) of the inertial platform of the device C.

A schematic presentation of the exchanges between C and P within the scope of the implementation of the present example is given in FIG. 12, wherein the solid arrow represents the information flow relating to the displacement of the device C, and the dotted arrow represents the RSSI measurement, performed by P on the basis of the signal received from C.

The example proposes an embodiment where the entire process is processed (estimation of the position of C relative to P), validated (estimation of the truth of the position C and aberration management) and then displayed by P.

The devices C and P calculate their own displacement by means of the measurements from A, M and G on each of the devices. For each, a frequency of 10 Hz is sufficient for a correct estimation of the movements of both devices.

C transmits at a frequency of 10 Hz a signal for measuring the RSSI between the devices C and P. These measurements are required for the processing for estimating a reliable RSSI measurement at the right moment.

C transmits at a frequency of 50 Hz the information relative to the displacement thereof. Redundancy of the information is very useful in order to overcome various communication problems due to the environment (information loss).

The device C has been embodied in an integrable form in a wristband type holder in a case wherein the specificities enable the latter to be attached to an item of the bearer's clothing.

What is claimed is:

1. A method for tracking, in a Cartesian plane, at least one first device with respect to a second device, given that at least one of the first device and the second device is equipped with an inertial platform, and given that each of the first device and the second device is equipped with a transmitter-receiver type communication module, said method comprising:

initializing the first device and the second device by an angular synchronization thereof with respect to a terrestrial magnetic north;

receiving, by the first device from the second device or by the second device from the first device, at a time $t_n$, an RSSI measurement, and determining a set of possible positions of the first device with respect to the second device in a metric space of the RSSI measurement;

receiving, by the first device from the second device or by the second device from the first device, at the time $t_{n+1}$, at least one item of information regarding a displacement of the first device and/or of the second device, said at least one item of information including at least a direction as well as a distance traveled for the interval $t_n\ t_{n+1}$;

converting the traveled distance into a metric space of the RSSI measurement (referred to as "RSSI domain"), and determining a set of positions in the metric space of the RSSI measurement of the first device with respect to the second device;

receiving, at the time $t_{n+1}$, a new RSSI measurement, and determining a set of positions of the first device with respect to the second device at the time $t_{n+1}$;

determining, a relationship between the determined positions in the metric space of the RSSI measurement and the position(s) determined of the first device at the time $t_{n+1}$;

determining, using the determined relationship, whether the determined position(s) are plausible, possible or likely with respect to the positions determined at previous times, and then determining a position of the first device with respect to the second device, wherein:

initializing is required where the first device is equipped with an inertial platform and moves during execution of the method, and optional if the first device does not move during execution of the method, and the second device is equipped with an inertial platform so that any displacement thereof is to be taken into account during execution of the method.

2. The method of claim 1, further comprising displaying, on a display screen of the second device, the position of the first device with respect to the second device.

3. The method of claim 1, further comprising displaying, on a display screen of the second device, the direction and the distance of the first device with respect to the second device.

4. The method of claim 1, wherein determining, using the determined relationship, whether the determined position(s) are plausible, possible or likely, comprises comparing polar coordinates of the first device with respect to the second device between $t_{n+1}$ and $t_n$ and/or $t_{n-n}$ (where m≥1).

5. The method of claim 4, wherein a most probable position at $t_{n+1}$ is determined, by correlating angular differences with the distance calculated between the first device and the second device at the time $t_{n+1}$.

6. The method of claim 1, further comprising initializing, at time $t_n$ by a user of the second device, on a first implementation of a measurement cycle.

\* \* \* \* \*